(12) United States Patent
Haldenby et al.

(10) Patent No.: US 10,762,481 B2
(45) Date of Patent: Sep. 1, 2020

(54) SECURE OFFLINE APPROVAL OF INITIATED DATA EXCHANGES

(71) Applicant: The Toronto-Dominion Bank, Toronto (CA)

(72) Inventors: Perry Aaron Jones Haldenby, Toronto (CA); Milos Dunjic, Toronto (CA); John Jong-Suk Lee, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 500 days.

(21) Appl. No.: 15/464,505

(22) Filed: Mar. 21, 2017

(65) Prior Publication Data

US 2018/0276666 A1    Sep. 27, 2018

(51) Int. Cl.
| | |
|---|---|
| *G06Q 20/10* | (2012.01) |
| *H04L 29/06* | (2006.01) |
| *H04L 9/32* | (2006.01) |
| *G06Q 20/20* | (2012.01) |

(52) U.S. Cl.
CPC .............. *G06Q 20/10* (2013.01); *G06Q 20/20* (2013.01); *H04L 9/3236* (2013.01); *H04L 9/3268* (2013.01); *H04L 9/3271* (2013.01); *H04L 63/10* (2013.01); *G06Q 2220/00* (2013.01); *H04L 2209/38* (2013.01)

(58) Field of Classification Search
CPC .................................................. H04L 2209/38
See application file for complete search history.

(56) References Cited

U.S. PATENT DOCUMENTS

| | | | |
|---|---|---|---|
| 8,046,261 B2 | 10/2011 | Ghosh et al. | |
| 8,151,335 B2 | 4/2012 | Wankmueller et al. | |
| 8,458,092 B2 | 6/2013 | Ward et al. | |
| 8,584,936 B2 | 11/2013 | Fiebiger et al. | |
| 8,856,063 B2 | 10/2014 | Smith et al. | |
| 8,949,152 B2 | 2/2015 | Cowen | |
| 9,020,853 B2 | 4/2015 | Hoffman et al. | |
| 9,098,851 B2 | 8/2015 | Cowen | |
| 2011/0178884 A1 | 7/2011 | Teicher et al. | |
| 2012/0173423 A1 | 7/2012 | Burdett et al. | |

(Continued)

OTHER PUBLICATIONS

Poutanen, "NetCents protocol for inexpensive Internet payments," University of Toronto, 1998 (99 pages).

*Primary Examiner* — Jamie R Kucab
(74) *Attorney, Agent, or Firm* — Duane Morris LLP

(57) ABSTRACT

The disclosed embodiments include processes that securely approve and execute exchanges of data between systems, apparatuses, and devices in a computing environment. For example, a terminal device may establish communications with a client device across a direct channel of communication, and may initiate an exchange of data with that additional device across the direct communications channel. The initiated data exchange may be characterized by a value of a data-exchange parameter, and the terminal device may determine to authorize the current data exchange in real-time based on cryptographically secure distributed ledger data maintained by the client device and provided to the terminal device across the direct communications channel. Further, and based on transmitted confirmation data, the client device may generate additional, cryptographically secure of the distributed ledger data to reflect the authorized data exchange.

20 Claims, 12 Drawing Sheets

(56) References Cited

U.S. PATENT DOCUMENTS

| | | |
|---|---|---|
| 2013/0024363 A1 | 1/2013 | Cunescu et al. |
| 2013/0212025 A1 | 8/2013 | Tanner et al. |
| 2014/0040146 A1 | 2/2014 | Fiske |
| 2014/0040149 A1 | 2/2014 | Fiske |
| 2015/0032617 A1 | 1/2015 | Canis et al. |
| 2015/0170112 A1 | 6/2015 | DeCastro |
| 2015/0339664 A1 | 11/2015 | Wong et al. |
| 2016/0224977 A1 | 8/2016 | Sabba et al. |
| 2016/0267605 A1 | 9/2016 | Lingham et al. |
| 2016/0292672 A1 | 10/2016 | Fay et al. |
| 2018/0181964 A1* | 6/2018 | Zagarese .......... G06Q 20/40145 |
| 2019/0102756 A1* | 4/2019 | Zhou .................... G06Q 20/065 |
| 2019/0147438 A1* | 5/2019 | Micali ................ G06Q 30/0207 705/71 |
| 2019/0287116 A1* | 9/2019 | Karantzis ............... G06Q 20/24 |
| 2019/0318326 A1* | 10/2019 | Russell ................. G07F 19/204 |

\* cited by examiner

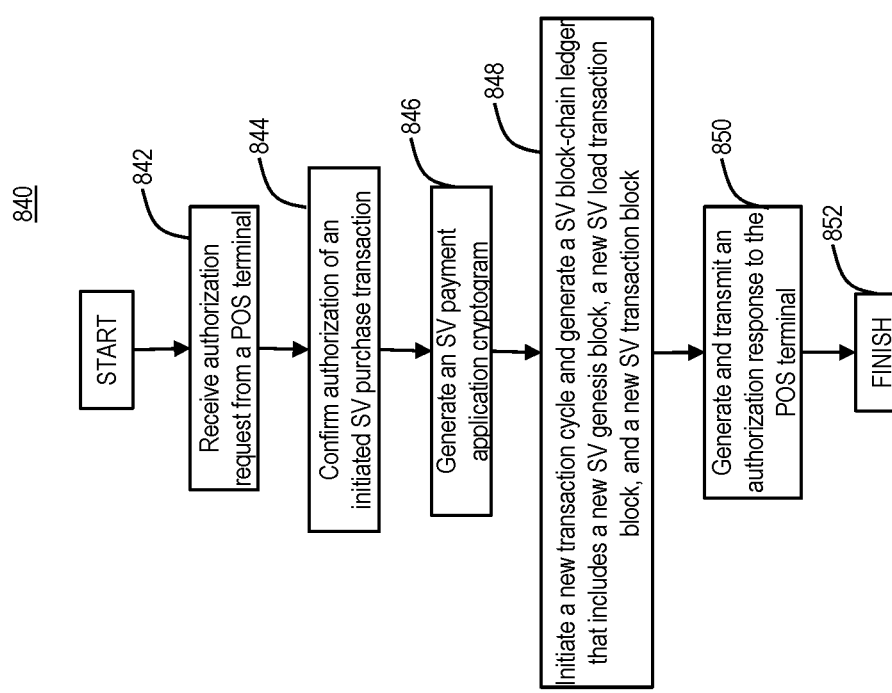
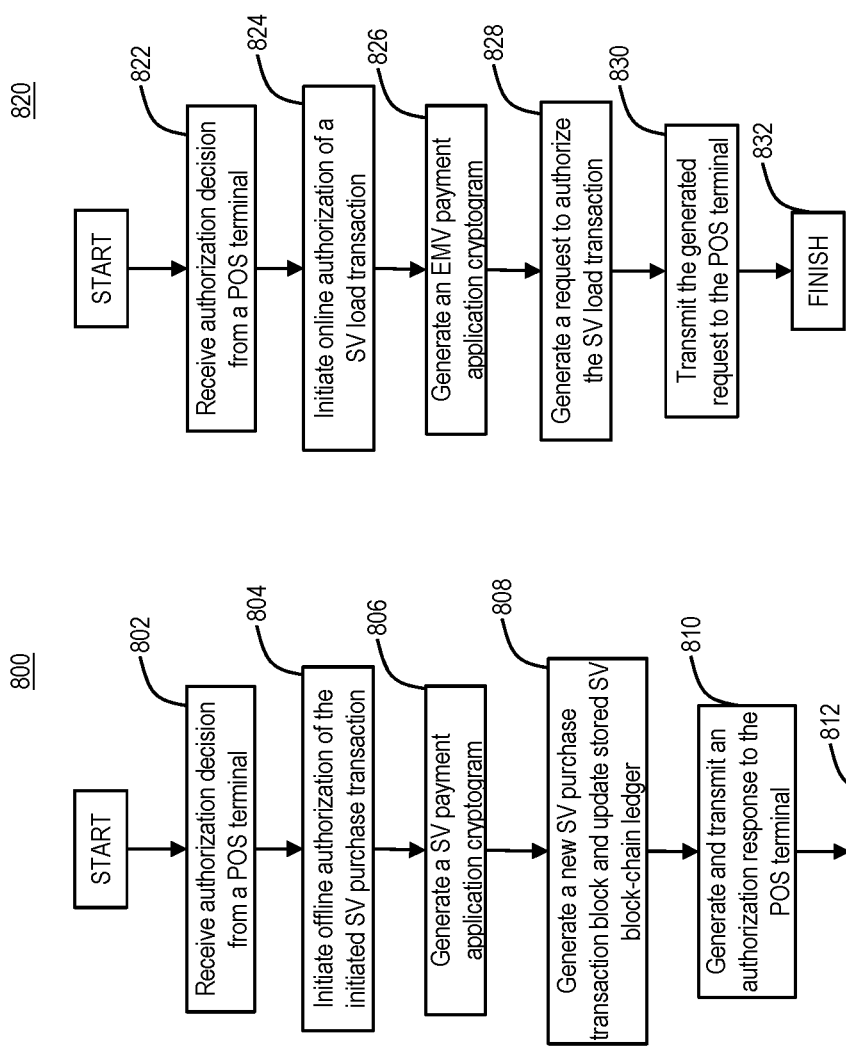
FIG. 8A
FIG. 8B
FIG. 8C

SECURE OFFLINE APPROVAL OF INITIATED DATA EXCHANGES

TECHNICAL FIELD

The disclosed embodiments generally relate to computer-implemented systems and processes that automatically initiate, approve, and execute exchanges of data between connected devices in a computing environment.

BACKGROUND

EMV-based transaction instruments, and the associated EMV-compatible authorization, clearing and settlement processing rails, are present throughout modern payment networks. As consumers continue to move from cash to physical transaction cards and digital payment instruments, even for routine and minor purchases, the volume of transactions processed through these EMV-compatible authorization, clearing and settlement processing rails continues to increase.

SUMMARY

The disclosed exemplary embodiments include, among other things, computer-implemented processes that initiate, approve, and perform cryptographically secure, offline exchanges of data between devices operating in a computing environment. In one embodiment, a terminal device may include a storage unit storing instructions, a communications module, an interface module, and at least one processor coupled to the communications module, the interface module, and the storage unit. The at least one processor may be configured to execute the instructions to receive, through the communications module, a first value of a parameter that characterizes an exchange of data initiated at the terminal device, and to transmit a request to, and receive a response from, a client device through the interface module. In one aspect, the response may include data corresponding to a distributed ledger and first cryptographic data, the distributed ledger data may include first data elements that track prior data exchanges involving the client device, and the prior data exchanges may be associated with corresponding second values of the parameter. The at least one processor may be further configured to execute the instructions to establish an authenticity of the client device based on the first cryptographic data and on second cryptographic data maintained by the terminal device, to authorize, based on the second parameter values, a performance of the initiated data exchange in accordance with the first parameter value, and to transmit, through the interface module, first confirmation data indicative of the authorized performance of the initiated data exchange to the client device. In certain aspects, the first confirmation data may include the first parameter value, and the first confirmation data may instruct the client device to generate a second data element of the distributed ledger data that tracks an impact of the initiated data exchange on the second parameter values. The second data element may, in some instances, be appended to the first data elements, and the second data element may include a hash pointer value that includes hash value of a corresponding one of the first data elements.

In further embodiments, a computer-implemented method may include receiving, by one or more processors, a first value of a parameter that characterizes an exchange of data initiated at a terminal device, and obtaining, by one or more processors, and from a client device, data corresponding to a distributed ledger and first cryptographic data. In one aspect, the distributed ledger data may include first data elements that track prior data exchanges involving the client device, and the prior data exchanges may be associated with corresponding second values of the parameter. The computer-implemented method may also include establishing, by one or more processors, an authenticity of the client device based on the obtained first cryptographic data and second cryptographic data maintained by the terminal device, verifying, by one or more processors, an integrity of the obtained distributed ledger data in response to the established authenticity of the client device, and based on the second parameter values, authorizing, by one or more processors, a performance of the data exchange in accordance with the first parameter value. The computer-implemented method further includes transmitting, by one or more processors, confirmation data indicative of the authorized performance of the initiated data exchange to the client device. In certain aspects, the confirmation data may include the first parameter value, and the confirmation data may instruct the client device to generate a second data element of the distributed ledger data that tracks an impact of the initiated data exchange on the second parameter values. The second data element may, in some instances, be appended to the first data elements, and the second data element may include a hash pointer value that includes hash value of a corresponding one of the first data elements.

Additionally, in certain embodiments, a device may include a storage unit storing instructions, an interface module, and at least one processor coupled to the interface module and the storage unit. The at least one processor may be configured to execute the instructions to receive, through the interface module, data indicative of an exchange of data initiated at a terminal device. The received data may, in one aspect, include a first value of a parameter that characterizes the initiated data exchange. The at least one processor may be further configured to execute the instructions to obtain, from the storage unit, data corresponding to a distributed ledger and first cryptographic data. The distributed ledger data may, in some aspects, include first data elements that track prior data exchanges involving the client device, and the prior data exchanges may be associated with corresponding second values of the parameter. The at least one processor may be further configured to execute the instructions to transmit, through the interface module, the distributed ledger data and the first cryptographic data to the terminal device. The terminal device may, in some instances, be configured to establish an authenticity of the device based on the transmitted first cryptographic data and second cryptographic data maintained by the terminal device and authorize, based on the second parameter values, a performance of the initiated data exchange in accordance with the first parameter value. The at least one processor may also be configured to execute the instructions to receive, through the interface module, first confirmation data indicative of the authorization of the initiated data exchange from the terminal device and in response to the confirmation data, generate a second data element of distributed ledger data that includes the first parameter value. In further aspects, the second element of distributed ledger data may be appended to the first data elements.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIGS. 7 and 8A-8C are flowcharts of exemplary processes for authorizing a performance of an initiated data exchange based on parameter data maintained within a distributed ledger data structure, in accordance with the disclosed embodiments

DETAILED DESCRIPTION

Figure 1:
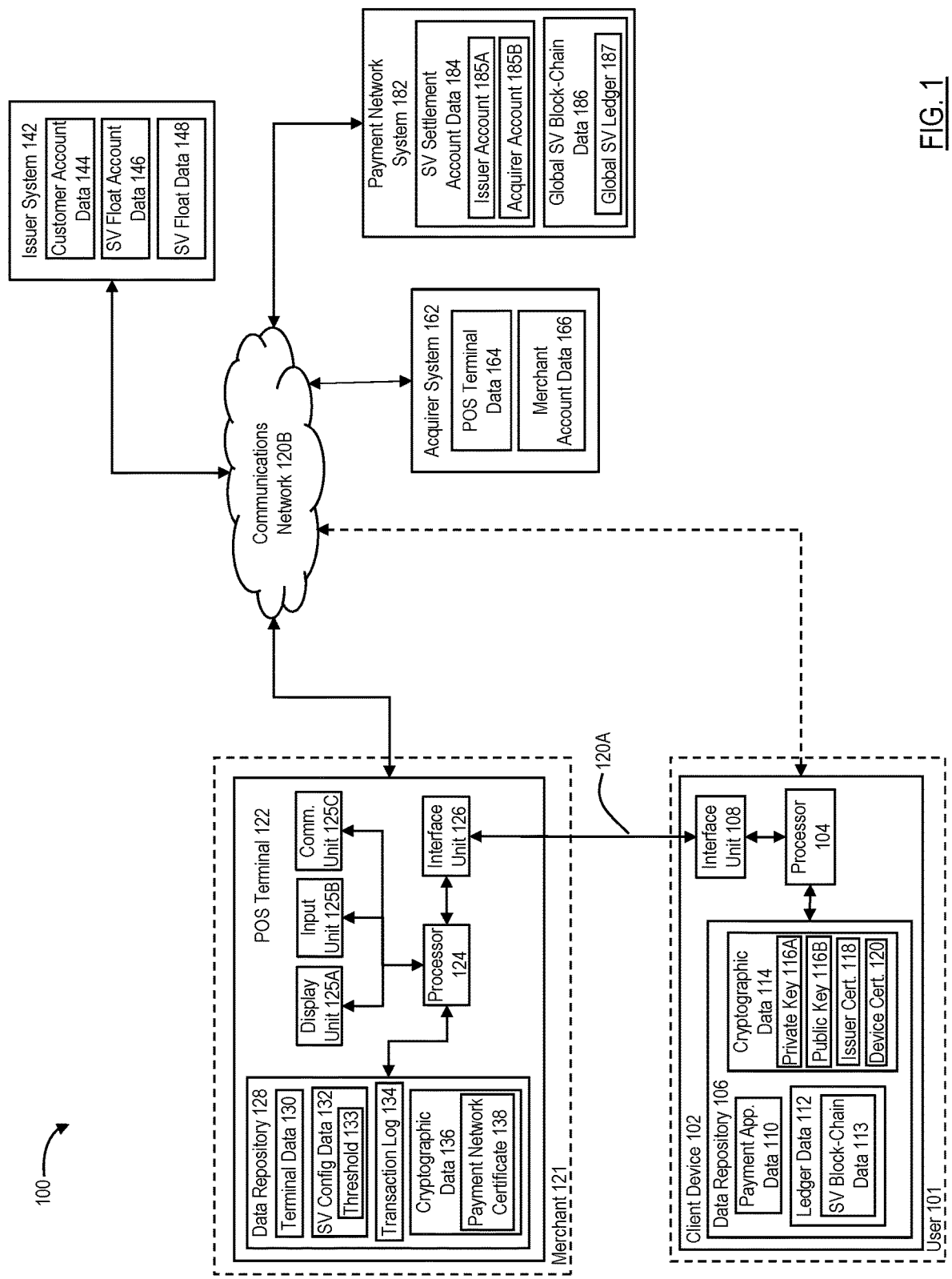
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

This specification describes exemplary computer-implemented apparatuses, devices, and processes that, among other things, perform operations for initiating, approving, and performing exchanges of data between network-connected devices in a computing environment. In certain aspects, and as described below, a terminal device may establish communications with a client device across a direct channel of communication, and may perform operations that initiate an exchange of data with that additional device across the direct communications channel. The initiated data exchange, e.g., a "current" data exchange, may be characterized by a value of a data-exchange parameter, and the terminal device may determine to authorize the current data exchange in real-time based on cryptographically secure distributed ledger data, e.g., a block-chain ledger, maintained by the client device and provided to the terminal device across the direct communications channel.

In one aspect, the block-chain ledger may include discrete blocks of data, e.g., ledger blocks, each of which corresponds cryptographically secure representation of a prior data exchange involving the client device. As each of these prior data exchanges may also be characterized by a corresponding value of the data-exchange parameter, the block-chain ledger may specify an evolution of the data-exchange parameter values across the prior data exchanges, and may establish, collectively, a state of the data-exchange parameter at prior to initiation of the current data exchange. The terminal device may, in an embodiment, determine to approve the initiated data exchange based on a comparison of the value of the data-exchange parameter that characterizes the initiated data exchange and the current state of the data-exchange parameter, as established by the block-chain ledger.

The terminal device may transmit data indicative of the authorized data exchange, including the value of the data-exchange parameter that characterizes the now-authorized data exchange, to the client device across the direct communications channel. In one aspect, the client device may process the transmitted data and generate a cryptographically secure representation of the current data exchange, e.g., a new ledger block, and the client device may link the new ledger block to the maintained block-chain ledger to generate an updated block-chain ledger that reflects an impact of the current and now-authorized data exchange on the current state of the data exchange parameter. In certain aspects, by ensuring its immutability through the cryptographically secure, block-chain data structure, the client device may initiate offline transfer of the current state of the data-exchange parameter to the terminal device without risk of undetected, adverse manipulation by malicious third parties, and the terminal device authorize the performance of the current exchange in real-time based on the current state of the data-exchange parameter.

In one aspect, the initiated data exchange may facilitate a secure, offline approval of a transaction initiated at a network-connected device, such as a point-of-sale (POS) terminal device associated by with a merchant. For example, the initiated transaction may correspond to a purchase transaction in which a customer purchases a good or service from the merchant at an agreed-upon price (e.g., a transaction amount), and the POS terminal device may be configured to receive data identifying one or more payment instruments, loyalty programs, and/or rewards programs available to the customer for use in the initiated transaction. Payment instruments consistent with the disclosed embodiments may include, but are not limited to, credit and debit card accounts (e.g., Visa™ credit card accounts, etc.) held by the customer and issued by one or more financial institutions (e.g., issuers), checking or savings accounts held by the customer at one or more financial institutions, electronic funds transfers (e.g., e-transfers), units of one or more digital currencies held by the customer in one or more corresponding accounts (e.g., units of Bitcoin™, Litecoin™, etc.), and other accounts held by or available to the customer and capable of funding the initiated purchase transaction.

The POS terminal device may, in certain instances, establish a direct channel of communications with a client device operated by the customer, which may store a payment application linked to a corresponding one of the payment instruments, such as those described above. Upon execution of the payment application, the client device may be configured to exchange data identifying the payment instrument with the POS terminal device across the direct communications channel, and the POS terminal device and the client may each perform certain operations that authorize the initiated payment transaction based on the exchanged payment instrument data.

By way of example, the client device may correspond to a tam per-resistant, integrated circuit embedded within an EMV-compatible payment card, which includes a microprocessor and one or more tangible, non-transitory memories that store the payment application and other supporting data. In other instances, the client device may include a communications device operated by the customer, such as a smart phone or tablet computer, which may store the payment application in one or more tangible, non-transitory memories and execute the payment application to perform any of the exemplary processes described herein. The disclosed embodiments are, however, not limited to these exemplary client devices, and in other aspects, the client device 102 may include any additional or alternate device (e.g., a NFC sticker or dongle) capable of establishing the direct communications channel with POS terminal 122 and performing the exemplary processes described herein.

In certain aspects, the payment application stored and executed by the client device may include an EMV payment application may be compatible with one or more EMV-based transaction protocols, and the POS terminal device and the client device may each perform certain operations consistent with these EMV-based transaction protocols to authorize the initiated payment transaction and submit the authorized transaction to an appropriate payment network (e.g., a payment rail) for settlement and clearance. For example, and in response to the payment instrument data received from the client device, the POS terminal device may apply one or more EMV-compatible risk-assessment techniques to portions of the payment instrument data and to transaction data characterizing the initiated purchase transaction (e.g., a transaction value, a product identifier, etc.). Based on an outcome of the applied risk-assessment techniques, the POS terminal device may characterize a level of risk (e.g., of fraud, of issuer decline, etc.) associated with the initiated purchase transaction, and perform operations that authorize the initiated purchase transaction either offline and without prior input from a computer system maintained by an issuer of the payment instrument (e.g., using one or more offline EMV authentication protocols) or alternatively, in accordance with an authorization decision provided to the POS device by the issuer computing system (e.g., using one or more online EMV authentication protocols).

The POS terminal device may, in some instances, store data indicative of the authorized purchased transaction, or alternatively, the declined purchase transaction, within one or more tangible non-transitory memories. In certain aspects, the POS terminal device may transmit portions of the stored data to a computing system maintained by the payment network at predetermined intervals, such as at a completion of a business day or a completion of a calendar day, and the payment-network computing system may perform processes that reconcile, settle, and clear each authorized transaction in accordance with the one or more EMV-based transaction protocols.

For example, the payment-network computing systems may obtain and reconcile transaction data maintained associated with the merchant (e.g., as maintained by the POS terminal device), an acquirer that administers the POS terminal device (e.g., as maintained by a computing system of the acquirer), and the issuer (e.g., the issuer system) on a transaction-by-transaction basis for each of the authorized transactions. Upon completion of the reconciliation process, the payment-network computing system may clear and settle the reconciled transactions by debiting funds corresponding to an aggregate value of the reconciled transactions from an issuer settlement account, deducting fees imposed on the acquirer from the debited funds, and crediting a remaining portion of these debited funds to an acquirer settlement account. The acquirer computing system may perform operations that transfer the funds from the acquirer settlement account to one or more accounts of the merchant that operates the POS terminal device. Similarly, the issuer system may transfer the aggregate value of the reconciled transaction from the payment instrument account of the customer to the issuer settlement account maintained by the payment-network computing system.

The exemplary clearance and settlement processes described above, which leverage conventional payment rails and require the reconciliation of merchant, issuer, and acquirer data on a transaction-by transaction basis, are computationally inefficient and often result in significant delays between a time at which the POS terminal device authorizes an initiated purchase transaction, and a time at which the payment-network computing system clears and settles the authorized purchase transaction, and further, credits the acquirer settlement account with funds available for disbursement to the merchant account. Further, as consumers increasingly utilize non-cash payment instruments (e.g., credit cards, debit cards, etc.) in purchase transactions, the number of authorized transaction requiring settlement and clearance by these conventional payment rails also increases, along with the number of disputed or fraudulent transactions (e.g., chargebacks) that require additional scrutiny and review during the reconciliation process. The increased number of authorized purchase transactions, coupled with the corresponding rise in chargebacks, further reduce the computational inefficiencies of the clearance and settlement processes, and contribute to additional delays in the settlement and funding of these authorized transactions using conventional payment rails.

Further, for many merchants, a significant portion of the purchase transactions initiated at corresponding POS terminal devices exhibit similar transaction parameters, such as transaction values that fall below a particular threshold value, e.g., $10.00. For example, a merchant may operate a coffee shop, and customers of that coffee shop may initiate, at a corresponding POS terminal device, a large volume of transactions to purchase coffee or pastries within certain portions of the merchant's business day (e.g., a morning rush, lunchtime, etc.). In certain aspects, the application of EMV-based risk-assessment techniques by the POS terminal device under these inflated transaction-velocity conditions may overestimate the risk associated with each of the initiated purchase transactions, and may cause the POS terminal device to authorize these initiated purchase transactions using the costly, time-inefficient, and in many instances, unnecessary online EMV-based authentication protocols described above. The significant delays in transaction authorization, settlement, and funding, coupled with the transaction fees imposed on merchants by the payment networks and acquirers for the unnecessary online authorization processes, may motivate merchants to eschew conventional payment rails in the authorization, clearance, and settlement of initiated purchase transactions, and to force consumers to use other payment instruments, such as cash.

Certain of the exemplary, computer-implemented processes described below, which provide a fast, reliable, and secure offline transaction capability between a the client device and the POS terminal device, and which facilitate a near-real time clearing and settlement capability for purchase transactions initiated at and authorized by the POS terminal device, may be implemented in addition to or as an alternate to computationally inefficient EMV-based transaction authorization, clearance, and settlement processes that leverage conventional payment-network systems and payment rails. Further, certain of the exemplary, computer-implemented processes described below, which utilize an immutable, cryptographically secure block-chain data structure to authorize initiated purchase transactions reliably and in real-time, may be implemented in addition to or as an alternate to certain EMV-based transaction authorization processes, which authorize purchase transactions based on terminal-based risk assessments and rely on back-end settlement processes to identify and reconcile chargebacks resulting from fraudulent or disputed activity.

I. Exemplary Computing Environments

FIG. 1 is a diagram illustrating an exemplary computing environment 100, consistent with certain disclosed embodiments. As illustrated in FIG. 1, environment 100 may include a client device 102, which may be in communication with a point-of-sale (POS) terminal 122 across a direct communication channel 120A. Environment 100 also includes an issuer system 142, an acquirer system 162, and a payment network system 182, each of which may be interconnected to POS terminal 122 (and in some aspects, client device 102) through any appropriate combination of communications networks, such as network 120B. Examples of network 120B include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some instances, POS terminal 122 may be associated with a merchant, e.g., merchant 121, and client device 102 may be associated with or operated by a customer of merchant 121, e.g., user 101. For example, POS terminal 122 may be disposed within a physical location of merchant 121, such as a location where a customer, e.g., user 101, provides payment for goods and/or services (e.g., at a cash register at merchant 121). In one aspect, client device 102 may correspond to a consumer payment device that, upon establishing communication with POS terminal 122 across direct communications channel 120A, provides data to POS terminal 122 specifying a payment instrument available for use in the initiated purchase transaction for the goods and/or services.

For example, client device 102 may include a tamper-resistant integrated circuit embedded within a smart payment card. The tamper-resistant, integrated circuit may include a processor, e.g., processor 104, and one or more tangible, non-transitory memories storing software instructions and executable application modules that, when executed by processor 104, cause client device 102 to perform operations consistent with the disclosed exemplary embodiments. For example, the stored software instructions may include an executable payment application linked to a payment instrument available to fund purchase transactions initiated at POS terminals operating within environment 100, such as POS terminal 122.

The payment instrument may, in some instances, be issued to user 101 by a financial institution, e.g., a financial institution that operates issuer system 142, and issuer system 142 may perform operations that provide the executable payment application to client device 102 for storage within the one or more tangible, non-transitory memories. Payment instruments consistent with the disclosed embodiments include, but are not limited to, a credit or debit card accounts held by user 101, an account that includes units of one or more digital currencies held by user 101, a checking or savings account held by user 101 at one or more financial institutions, an electronic funds transfer, and/or other accounts held by or available to user 101 and capable of funding purchase transaction initiated at POS terminal devices operating within environment 100, such as POS terminal 122.

Client device 102 may also store, within the one or more tangible, non-transitory memories, data that supports the execution of the payment application. The supporting data may be specific to the payment application, and may include, but is not limited to, data uniquely identifying the payment application (e.g., application identifiers (AIDs)), specific elements of data requested by client device 102 prior to execution of the payment application (e.g., a set of data elements specified within a processing options data object list (PDOL)), data specifying certain authentication and verification processes implemented by the payment application (e.g., application interchange protocol (AIP) data), and data specifying locations of application-specific data and files (e.g., within a file structure of the tangible, non-transitory memories).

The payment application may, in some aspects, include a payment application compatible with one or more EMV-based transaction authorization protocols described above (e.g., an EMV payment application). The EMV payment application may be linked to a payment instrument capable of funding a purchase transaction initiated at POS terminal 122 by client device 102 and, when executed by processor 104, may cause client device 102 to perform operations that authorize the initiated purchase transaction using the one or more EMV-based transaction authorization protocols, such as an offline EMV authorization protocol and/or an online EMV authorization protocols.

As described above, however, certain of the EMV-based transaction authorization protocols may be computationally inefficient, and may result in significant delays in the final clearing and settlement of purchase transactions initiated at POS terminal 122, especially when applied to large numbers of similar purchase transactions initiated at POS terminal 122. In further aspects, the payment application may also include an stored-value (SV) payment application, that when executed by processor 104, causes client device 102 to perform processes that, in conjunction with POS terminal 122 and/or issuer system 142, securely and reliably authorize certain purchase transactions initiated at POS terminal 122 (e.g., SV purchase transactions) based on an immutable and cryptographically secure distributed ledger data structure, which may be generated and maintained by client device 102 to establish a record of prior authorized SV purchase transactions involving client device 102. In an embodiment embodiments, client device 102 and/or POS terminal 122 may implement certain of the exemplary, SV-based processes described below, which utilize an immutable, cryptographically secure distributed-ledger data structure to authorize initiated SV purchase transactions reliably and in real-time, in addition to or as an alternate to certain EMV-based processes, which authorize purchase transactions based on terminal-based risk assessments and rely on back-end settlement processes to identify and reconcile chargebacks resulting from fraudulent or disputed activity.

By way of example, the SV purchase transactions may include a purchase transaction characterized by a transaction value that fails to exceed a configurable threshold transaction value. For instance, the initiated SV purchase transaction may represent a purchase by user 101 of a $2.50 cup of coffee from merchant 121, and the $2.50 transaction value may fall below the configurable threshold transaction value, e.g., $10.00, which may establish an upper bound in transaction value that defines an SV purchase transaction. The disclosed embodiments are, however, not limited to these exemplary SV purchase transactions, and in other instances, SV purchase transactions consistent with the disclosed embodiments may be characterized by transaction values that fail to exceed any additional or alternate threshold transaction value, or by any additional or alternate transaction parameter appropriate to merchant 121, issuer system 142, acquirer system 162, and/or payment network system 182.

In an embodiment, issuer system 142 may issue the payment instrument linked to client device 102, and may maintain, within the tangible, non-transitory memories, account data that specifies certain account parameters of an underlying account that funds the payment instrument (e.g., a payment instrument account), such as an account balance of an underlying account or funds available for use in purchase transactions. For example, issuer system 142 may perform processes that transfer funds from the payment instrument account (e.g., as linked to client device 102 and held by user 101) to a new financial services account generated and maintained by issuer system 142, e.g., an SV "float" account. The SV float account may, in some aspects, aggregate the funds transferred from the payment instrument account held by user 101 with funds transferred from similar accounts maintained by issuer system 142 on behalf of other users operating consumer payment devices in environment 100. Further, by transferring the funds from the user 101's payment instrument account to the float account, issuer system 142 may designate these newly transferred funds as available for use in SV purchase transactions authorized, cleared, and settled in real-time and accordance with the exemplary processes described herein. In certain embodiments, client device 102 and POS terminal 122 may perform operations that provide, to issuer system 140, a request to authorize a transaction (e.g., an SV load transaction) that, when authorized and completed by issuer system 140, loads client device 102 with the newly transferred funds for use in initiated SV purchase transactions, as described below.

Referring back to FIG. 1, client device 102 includes processor 104, and establishes a data repository, e.g., data repository 106, within the one or more tangible, non-transitory memories. Client device 102 may also include a device interface unit 108 that, in some aspects, includes one or more electrical connectors configured to physically contact and engage with corresponding electrical contacts of a device interface unit associated with POS terminal 122, e.g., terminal interface unit 126, as described below.

In some aspects, client device 102 may store data within data repository 106 in accordance a hierarchical tree structure. For example, data repository 106 may be structured in accordance with a conventional EMV-based file structure, and may include a master file that incorporates one or more application definition files (e.g., ADFs). Each application data file may, in certain instances, be associated with an executable application, e.g., the executable SV and EMV payment applications described above, and may each be assigned a unique application identifier (e.g., an AID). Further, each of the application data files, e.g., the ADF associated with the SV payment application, may also be associated and linked to additional file structures (e.g., application elementary files (AEFs)) that store data related to the executable application, and each of the application elementary files may also be linked to a unique identifier (e.g., a short file identifier (SFI)). The disclosed embodiments are, however, not limited to these exemplary file systems and structures, and in other aspects, data repository 106 may include any additional or alternate file system structure, include a lack of structure, that would be appropriate to client device 102 and operable with the executed payment applications, e.g., the SV and EMV payment applications described herein.

As illustrated by FIG. 1, data repository 106 may include payment application data 110, ledger data 112, and cryptographic data 114. In one aspect, payment application data 110 may include one or more SV payment applications and application extensions, such as the exemplary SV payment application described above. Further, payment application data 110 may also include additional application-specific data that supports the execution of the SV payment application. For example, the additional application data may include, but is not limited to, data that uniquely identifies the SV payment application within data repository 106 (e.g., an AID assigned to the SV payment application), specific elements of data required by client device 102 prior to executing the SV payment application (e.g., as specified by a PDOL for the SV payment application, which may be stored in the SV payment application's ADF), data specifying certain authentication and verification processes implemented by the SV payment application (e.g., an AIP associated with the SV payment application), and/or data providing addresses of other data specific to the SV payment application within data repository 106 (e.g., an AFL of the SV payment application). The disclosed embodiments are, however, not limited to these examples of application-specific data, and in further embodiments, payment application data 110 may include any additional or alternate elements of application-specific data appropriate to the SV payment application or any additional or alternate SV, EMV or other payment application or application extension executable by processor 104.

In one aspect, the SV payment application may correspond to a stand-alone payment application that, when executed by processor 104, causes device 102 to perform the exemplary processes described herein while maintaining a compatibility with conventional EMV standards and command protocols. For example, the stand-alone SV payment application may be based on an existing, conventional EMV payment application, and may incorporate specific modifications and/or additional code modules. In other instances, payment application data 110 may also include an EMV payment application, such as the conventional EMV payment applications described above, and the SV payment applications consistent the disclosed embodiments may include an application extension or plug-in operable with the EMV payment application. The maintenance of the compatibility between the SV payment application and conventional EMV standards and protocols may, in some aspects, facilitate an interoperability of the SV payment application with legacy payment networks and systems operable in accordance with these conventional EMV standards and protocols.

Payment application data 110 may, in some instances, also include data identifying the payment instrument associated with the SV payment application (and additionally or alternatively, one or more of the conventional EMV applications described above). For example, and as described above, the payment instrument may include a credit card account held by user 101 and issued by issuer computing system 142, and the payment instrument data may include, but is not limited to, an account number, expiration date, and card security code (CSC), and any additional or alternate information that would facilitate a successful authorization of an SV purchase transaction initiated POS terminal 122.

Ledger data 112 may include the cryptographically secure distributed ledger data that tracks an evolving balance of funds loaded onto client device 102 through a prior SV load transaction (e.g., the "last" load transaction) authorized and completed by issuer system 142. In one instance, a "current" balance of loaded funds may reflect those funds immediately available for use in SV purchase transactions involving client device 102 and one or more POS terminals operating within environment 100, e.g., POS terminal 122.

In some aspects, the distributed ledger data may correspond to a latest, longest version (e.g., a "current" version) of an SV block-chain ledger 113 that includes an SV genesis block reflecting the balance of the loaded funds before the prior SV load transaction (e.g., through which issuer system 142 transferred funds consistent with a predetermined or adaptively determined transfer amount from user 101's payment instrument account to the float account). SV block-chain ledger 113 may also include an SV purchase transaction data block linked to the SV genesis block and reflecting the prior SV load transaction authorized by issuer system 142 (e.g., identifying the fund consistent with the transfer amount that are available for use in SV purchase transactions), and further, one or more SV purchase transaction blocks reflecting corresponding authorized SV purchase transactions involving client device 102, each of which consume a respective portion of balance of the funds loaded onto client device 102 through the prior authorized SV load transaction.

In certain embodiments, the SV genesis block, the SV load transaction block, and the one or more successive SV purchase transaction blocks may establish a current transaction cycle initiated by the prior authorized SV load transaction. By way of example, the current transaction cycle terminates when an outstanding balance of funds loaded onto client device 102 by that prior authorized SV load transaction (as reduced by the successive, authorized SV purchase transactions represented by the SV purchase transaction blocks) is insufficient for a new SV purchase transaction initiated at POS terminal 122 and involving client device 102. Further, and in certain aspects, client device 102 and/or POS terminal 122 may process SV block-chain ledger 113 to track and establish a current balance of the funds loaded onto client device 102 by the prior authorized SV load transaction, e.g., an SV unspent transaction output (UTXO), which is available to fund additional SV purchase transactions involving client device 102 during the current transaction cycle. Further, by ensuring the immutability of the established current balance through the cryptographically secure structure of SV block-chain ledger 113, client device 102 may initiate a safe, offline exchange of SV block-chain ledger 113 with POS terminal device 122 across direct communications channel 120A without risk of undetected, adverse manipulation by malicious third parties.

Referring back to FIG. 1, cryptographic data 114 may include a private cryptographic key 116A and a corresponding public cryptographic key 116B. In certain instances, client device 102 may input device-specific private cryptographic key 116A to one or more hash-generation algorithms and digital signature operations, the output of which may form portions of SV block-chain ledger 113, as described below. Cryptographic data 114 also includes public key certificates of issuer system 142 and client device 102, e.g., issuer public key certificate 118 and device public key certificate 120. Issuer public key certificate 118 may, in one instance, be signed by a private cryptographic key maintained by payment network system 182 (e.g., acting as a certificate authority), and device public key certificate 120 may be signed by a private cryptographic key maintained by issuer system 142.

In some aspects, POS terminal device 122 may correspond to a computing device that includes one or more tangible, non-transitory memories that store data and/or software instructions, and one or more processors, e.g., processor 124, configured to execute the software instructions (e.g., one or more executable application modules). The one or more tangible, non-transitory memories may, in some aspects, store software applications, application modules, and other elements of code, which when executed by the one or more processors, cause POS terminal 122 to perform operations consistent with the disclosed embodiments, as described below.

POS terminal 122 may, in some instances, include a display unit 125A that displays information to user 101 and an input unit 125B that allows user 101 to input information to POS terminal device 122 (e.g., a keypad, keyboard, touchscreen, voice activated control technologies, or any other type of known input device). In other instances, not depicted in FIG. 1, the functionalities of display unit 125A and input unit 125B may be combined into a single unit, such as a pressure-sensitive touchscreen display. POS terminal device 122 may also include a communications unit 125C, such as a wireless transceiver device, coupled to the processor 124 and configured by processor 124 to establish and maintain communications with network 120 using any of the communications protocols described herein.

In further aspects, POS terminal device 122 may include or may be in communication with a terminal interface unit 126, such as a chip reader, capable of establishing direct communications channel 120A facilitating an exchange of data between POS terminal device 122 and client device 102. In some instances, as described above, terminal interface unit 126 may include terminal contacts configured to engage with the corresponding electrical contacts incorporated into client device 102, e.g., within device interface unit 108 of client device 102. For example, terminal interface unit 126 may be integrated into POS terminal device 122, e.g., as an integrated chip reader, and additionally or alternatively, may correspond to an external chip reader connected to POS terminal 122 through a wired or wireless communication channel (e.g., a USB connection, NFC communication channels, etc.). In other aspects, terminal interface unit 126 may also include a contactless interface unit capable of detecting and exchanging data the integrated circuit of a proximately disposed EMV-compatible payment card through electrical induction or radio-frequency (RF) technologies.

POS terminal 122 may also maintain (e.g., within the one or more tangible, non-transitory memories) a structured data repository 128 that includes terminal data 130, SV configuration data 132, a transaction log 134, and a cryptographic data 136. Terminal data 130 may, for example, include data that uniquely identifies POS terminal device 122 (e.g., an IP address, a MAC address, etc.), data identifying a location of POS terminal 122 (e.g., a geographic location of merchant 111 or country code assigned to POS terminal 122), and additionally or alternatively, data identifying a computer system that administers POS terminal device 122 (e.g., acquirer system 162). In one aspect, the acquirer may correspond to an entity that administers POS terminal 122, e.g., as part of a network of POS terminal devices, and acquirer system 162 may maintain one or more merchant accounts to receive proceeds from settled SV purchase transactions involving POS terminal device 122, which acquirer system 162 may disburse into one or more accounts held by merchant 121. Terminal data 130 may also include additional data identifying certain processing, communication, or interface capabilities of POS terminal 122, a manufacturer, model number, or terminal type associated with POS terminal 122, and any additional or alternate terminal data that, when requested by client device 102, facilitate a performance of the exemplary processes described herein.

In some aspects, SV configuration data 132 may include one or more configurable parameters, such as a configurable SV threshold value 133, that facilitate an initiation and authorization of an SV purchase transaction involving client device 102. For example, and as described above, POS terminal device 122 may characterize an initiated transaction as an SV purchase transaction when a transaction value of that initiated transaction falls below configurable SV threshold value 133. Configurable SV threshold value 133 may, in certain instances, be established based on input provided to POS terminal device 122 through input unit 125B, and additionally or alternatively, may be programmatically configured based on instructions transmitted by acquirer system 162 across network 120B

Data repository 128 may also include a transaction log 134, which may store initiated transaction data that characterizes one or more initiated SV purchase transactions, and authorized transaction data that characterizes one or more SV purchase transactions and/or SV load transactions authorized using the exemplary processes described herein. In some instances, the initiated transaction data may be received from a computing system operated by merchant 121, such as a cash register, and in communication with POS terminal 122 across a wired or wireless communications channel. Further, and in some aspects, POS terminal 122 may store portions of the authorized transaction data in transaction log 134 before transmitting that authorized transaction data to acquirer system 162 and payment network system 182 for near-real-time clearance and settlement.

Cryptographic data 136 may include, but is not limited to, data specifying a self-signed, public key certificate 138 associated with payment network system 182. In some aspects, self-signed, public key certificate 138 may be incorporated within cryptographic data 136 as part of a standardized process for configuring POS terminal device 122 to authorize SV purchase transactions through one or more of the exemplary SV authorization processes described herein.

Examples of POS terminal 122 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations consistent with disclosed embodiments. Further, although not depicted in FIG. 1, POS terminal 122 may also be coupled to a computing system associated with and maintained by merchant 121 (e.g., a cash register, etc.), which may include one more processors and one of more tangible, non-transitory memories storing one or more software applications, application modules, and other elements of code that, when executed by the one or more processors, cause the merchant computing system to exchange data with POS terminal device 122 (e.g., data characterizing an initiated SV transaction, such a transaction value) and perform operations consistent with the disclosed embodiments.

The disclosed embodiments are not limited to these examples of POS terminal devices, and in additional aspects, POS terminal 122 may correspond to one or more application modules executed by a computer system maintained by merchant 121, one or more computing systems operating within environment 100, one or more communications devices operating within environment 100. In other embodiments, POS terminal 122 may represent a device communicatively coupled to one or more communications devices operating within environment 100 to provide mobile point-of-sale and payment services, such as a Square™ device in communication with client device 102 across a wired or wireless communications channel.

Referring back to FIG. 1, issuer system 142, acquirer system 162, and payment network system 182 may each represent a computing system that includes one or more servers (e.g., not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments, including operations consistent with the exemplary LPV transaction authorization, clearance, and settlement processes described herein. In other instances, and consistent with the disclosed embodiments, one or more of issuer system 142, acquirer system 162, and payment network system 182 may correspond to a distributed system that may include computing components distributed across one or more networks, such as network 120B, or other networks, such as those provided or maintained by cloud-service providers.

As illustrated in FIG. 1, issuer system 142 may maintain customer account data 144, SV float account data 146, and SV load data 148 within the one or more tangible, non-transitory memories. In one aspect, issuer system 142 may be associated with and operated by a financial institution that issues payment instruments held by users of consumer devices operating within environment 100, e.g., user 101, and account data 144 may include, but is not limited to, data identifying underlying payment instrument accounts associated with each of the issued payment instruments (e.g., account numbers, expiration dates, assigned CSCs, etc.), current balances of these accounts, and funds from these accounts available for use in additional purchase transactions, such as the SV purchase transactions described herein. For example, as described above, client device 102 may be linked to a payment instrument account (e.g., a credit card account held by user 101) and capable of funding SV purchase transactions initiated by client device 102 at POS terminal 122, and account data 144 may identify an account balance, expiration date, assigned CSC, and other account identifiers of the credit card account, along with a current outstanding balance of the payment instrument account, along with a remaining amount of credit available to fund SV purchase transactions initiated by client device 102.

SV float account data 146 may include data that identifies the SV float account established and maintained by issuer system 142 and specifies a current account balance of funds aggregated from financial services accounts of user 101 and other users that operate consumer payment devices within environment 100. As described above, issuer system 142 may designate portions of the funds aggregated in the SV float account as available for SV purchase transactions initiated by client device 102 at POS terminal 122 (and by other consumer payment devices in communication with POS terminal 122 and other POS terminals operating in environment 100), and SV load data 148 may include information that associates portions of the funds within the SV float account with corresponding source accounts (e.g., the financial services accounts described above) and corresponding account holders and/or consumer payment devices, and further, and information identifying authorized load transactions that load the portions of the float-account funds onto corresponding ones of the consumer payment devices. For example, SV load data 148 may identify a value of the funds transferred from the payment instrument account held by user 101, may identify the payment instrument account, user 101, and/or client device 102, and further, may include information identifying the authorized load transaction that loaded these transferred funds onto client device 102 (e.g., transaction date and time, transaction counters, etc.).

In additional aspects, acquirer system 162 may perform operations that administer one or more POS terminal devices operating within environment 100, such as POS terminal 122. As illustrated in FIG. 1, acquirer system 162 may maintain, within the one or more tangible, non-transitory memories, POS terminal data 164 that identifies one or more of the POS terminal devices administered by acquirer system 162 (e.g., an IP address, MAC address, or other unique device identifier of POS terminal 122), and merchant account data 166, which identifies accounts held by merchants associated with the POS terminal devices operating within environment 100, such as merchant 121 that operates POS terminal 122. In certain instances, and as described below, the merchant accounts may receive proceeds from one or more authorized SV purchase transactions, which may be cleared and settled in near-real-time using any of the exemplary SV purchase transaction clearance and settlement processes described herein.

Payment network system 182 may perform operations that clear and settle authorized SV purchase transactions in near real-time using one or more of the exemplary SV purchase transaction clearance and settlement processes described herein. In certain aspects, and to facilitate a performance of these exemplary clearance and settlement processes, payment network system 182 may maintain settlement account data 184 and global block-chain ledger data 186 within the one or more tangible, non-transitory memories. Payment network system 182 may, in some instances, establish and maintain an issuer settlement account on behalf of each issuer computing system operating in environment 100 (e.g., issuer settlement account 185A associated with issuer system 142), and further, establish and maintain an acquirer settlement account on behalf of each acquirer computing system operating in environment 100 (e.g., acquirer settlement account 185B associated with acquirer system 162).

By way of example, and upon clearance and settlement of an authorized SV purchase transaction involving a payment instrument issued by issuer system 142 (e.g., the payment instrument account linked to client device 102) and a POS terminal device associated with acquirer system 162, payment network system 182 may perform any of the processes described herein to transfer funds equivalent to a transaction amount of the authorized SV purchase transaction from issuer settlement account 185A to acquirer settlement account 185B. As described below, issuer system 142 may perform operations that transfer the funds equivalent to the transaction amount from the float account (e.g., as specified by float account data 146) to issuer settlement account 185A, and acquirer system 162 may access acquirer settlement account 185B, and further transfer these funds into a corresponding one of merchant accounts 164 for payment to merchant 111.

Further, in some aspects, global SV block-chain data 186 may include global block-chain ledgers that, for each consumer payment device operating within environment 100 (e.g., client device 102), provides a cryptographically secure representation of each authorized load transaction and each authorized SV purchase transaction involving that consumer payment device across its functional life. For example, global SV block-chain ledger 187 may include a genesis block that represents and initial, authorized SV load transaction that first loaded funds onto client device 102, and additional linked ledger blocks that provide cryptographically secure representations of subsequently authorized load transactions and SV purchase transactions involving client device 102 during transaction cycles occurring subsequent to that initial authorized SV load transaction.

In certain embodiments, the global block-chain ledgers included within global SV block-chain data 186 may provide a complete SV-chain history for each SV-enabled consumer payment device operating in environment 100. Additionally, in some aspects, payment network system 182 may restrict access to global SV block-chain data 186, and may implement one or more permissioning schemes that grant issuer system 142 and acquirer system 162 access to block SV block-chain data 186. Further, and as described below, payment network system may perform operations that update global SV block-chain data 186 to reflect a newly authorized SV purchase transaction and/or SV load transaction in response to an established consensus between issuer system 142 and acquirer system 162 regarding the validity of the newly authorized SV purchase transaction and/or SV load transaction.

II. Exemplary Computer-Implemented Processes for Initiating, Approving, and Performing Secure Offline Exchanges of Data Between Devices Using Distributed Ledger Data In some embodiments, a network-connected device, such as POS terminal 122, may perform operations that initiate an exchange of data with a client device, e.g., client device 102, across a direct channel of communications established between client device 102 and POS terminal 122, e.g., direct communications channel 120A. As described above, the initiated data exchange may be characterized by a value of a data-exchange parameter, and terminal device 122 may perform operations that authorize the initiated data exchange offline and in real-time based on immutable and cryptographically secure distributed ledger data, e.g., a block-chain ledger, maintained by client device 102 and provided to POS terminal 122 across direct communications channel 120A.

The initiated data exchange may, in certain instances, facilitate a secure, offline approval of a purchase transaction initiated at POS terminal 122 by a customer of merchant 121, e.g., user 101. For example, as described above, user 101 may elect to purchase a cup of coffee from merchant 121 (e.g., a local coffee shop) for an agreed-upon price of $2.50 (e.g., the transaction value). A computing system maintained by merchant 121 (e.g., a cash register) may obtain transaction data characterizing the initiated purchase transaction, such as an identifier of the cup of coffee involved in the transaction and the corresponding transaction value, and provide the obtained transaction data to POS terminal 122 across any appropriate wired or wireless connection.

POS terminal 122 may, for example, determine that the $2.50 transaction value of the initiated purchase transaction fails to exceed a configurable threshold transaction value, and in response to the determination, POS terminal 122 may establish that the initiated purchase transaction represents a stored-value (SV) purchase transaction. In response to the determination, POS terminal device 122 may exchange data with client device 102 that facilitates a selection of an available and appropriate SV payment application stored locally by client device 102, may initiate an execution of the selected SV payment application by processor 104 and further, may obtain from client device 102 data that facilitates a reliable and secure authorization of the initiated SV purchase transaction in real time.

For example, and as described above, the selected SV payment application may be associated with a payment instrument held by user 101 and issued by a financial institution associated with issuer system 142. In certain aspects, and through an online authorization of a request generated by client device 102 in accordance with certain EMV authorization and communications protocols, issuer system 142 may authorize an SV load transaction specified by the request, and may transfer funds consistent with a predetermined or adaptively determined transfer amount of a payment instrument account of user 101 to an SV float account, which "loads" client device 102 with a balance of funds designated for use in SV purchase transactions. Client device 102 may, in some instances, generate and maintain a cryptographically secure SV block-chain ledger, e.g., SV block-chain ledger 113, that tracks the authorized SV load transaction and successive authorized SV purchase transaction that consume portions of the loaded funds, and established a current balance of the loaded funds available for use in a newly initiated SV purchase transaction.

By ensuring the immutability of the current loaded-fund balance through the cryptographically secure block-chain structure, client device 102 may freely transmit SV block-chain ledger 113 to POS terminal 122. In certain embodiments, and when the current balance of the loaded funds, as established by the block-chain ledger, exceeds the transaction value of the initiated SV purchase transaction, POS terminal 122 and client device 102 may perform operations that authorize the initiated SV purchase transaction offline and in real-time, and that update SV block-chain ledger 113 to reflect the newly authorized SV purchase transaction and its impact on the current balance of the loaded funds. Alternatively, should the current balance of the loaded funds prove insufficient to fund the transaction value of the initiated SV purchase transaction, POS terminal 122 and client device 102 may perform operations that, in conjunction with issuer system 142, request an online authorization of another SV load transaction to load additional funds designated for use in SV purchase transactions onto client device 102 and in response to a successful authorization and funds transfer into the SV float account, update the block-chain ledger to reflect the newly authorized SV load and purchase transactions.

Figure 2:
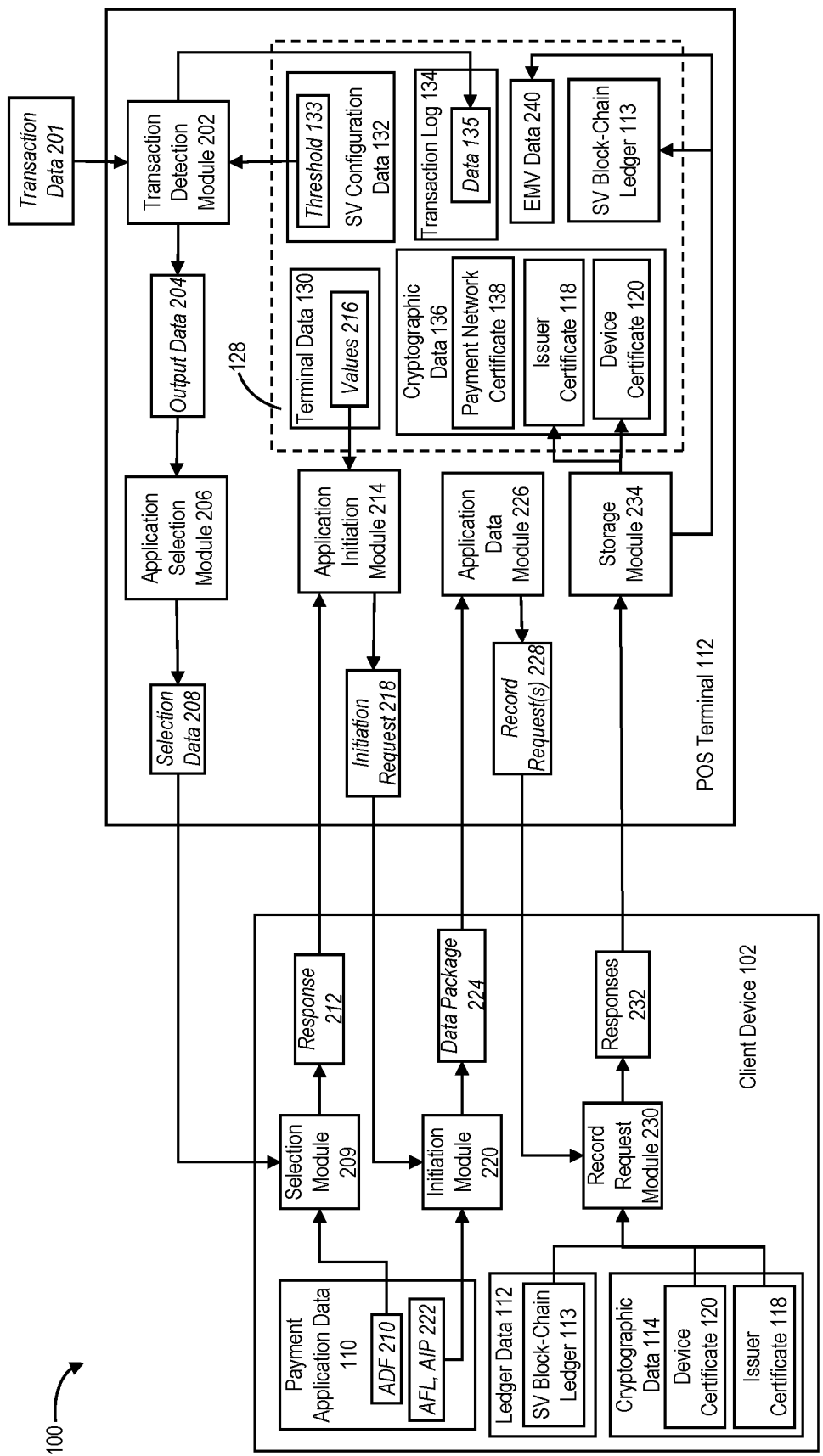
FIGS. 2 and 3A illustrates portions of an exemplary computing environment, in accordance with the disclosed embodiments.

Referring to FIG. 2, POS terminal 122 may receive transaction data 201 characterizing an initiated purchase transaction from a computing system maintained and operated by merchant 121 (e.g., a cash register, etc.). As described above, the initiated purchase transaction may correspond to a purchase of the cup of coffee from merchant 121 for the agreed-upon price of $2.50, transaction data 201 may include, but is not limited to, a product involved in the initiated purchase transaction (e.g., UPC data identifying the cup of coffee) and a transaction value of the initiated purchase transaction (e.g., $2.50). In certain aspects, a transaction detection module 202 may receive transaction data 201 from the merchant computing system (e.g., through communications unit 125C), and may perform operations that store the received transaction data within a corresponding portion of data repository 128, e.g., within initiated SV purchase transaction data 135 of transaction log 134.

Further, although not depicted in FIG. 2, POS terminal 122 may also perform operations that present portions of received transaction data 201 to user 101 through a graphical user interface (GUI), which POS terminal 122 may present through display unit 125A. In some instances, and in response to the presentation of GUI, user 101 may dispose device interface unit 108 of client device 102 in close proximity to terminal interface unit 126 of POS terminal 122, and client device 102 and POS terminal 122 may collectively establish and exchange data across direct communications channel 120A.

For example, and as described above, client device 102 may include an integrated circuit that encodes one or more payment applications embedded into an EMV-compatible payment card, and device interface unit 108 may include one or more electrical contacts configured to engage corresponding terminal contacts of terminal interface unit 126 when the EMV-compatible payment card is disposed within a chip reader integrated into or in communication with POS terminal 122. In certain aspects, the engagement of the electrical contacts of terminal interface unit 108 with the terminal contacts of terminal interface unit 126 may establish direct communications channel 120A that not only facilitates an exchange of data between POS terminal 122 and client device 102, but also enables POS terminal 122 to provide electrical energy client device 102. In other instances, and consistent with the disclosed embodiments, client device 102 may also include a communications device, such as a smart phone, tablet computer, or wearable communications device, that when disposed proximate to POS terminal device 122, establishes direct communications channel 120A with POS terminal 122 using one or more wireless communications protocols, such as near-filed communications (NFC) protocols, Bluetooth™ communications protocols, and/or WiFi communications. The disclosed embodiments are, however, not limited to these exemplary client devices, and in other aspects, client device 102 may any additional or alternate device (e.g., a NFC sticker or dongle) capable of establishing direct communications channel 120A with POS terminal 122 and performing the exemplary processes described herein.

Referring back to FIG. 2, transaction detection module 202 may access stored SV configuration data 132 (e.g., within data repository 128 of POS terminal 122) and obtain configurable SV threshold value 133, and may determine whether the transaction value of the initiated purchase transaction exceeds configurable SV threshold value 133. For example, and as described above, configurable SV threshold value 133 may correspond to a transaction value of $10.00, and may establish, as an SV purchase transaction, any initiated transaction having a transaction value less than or equivalent to configurable SV threshold value 133. The disclosed embodiments are not limited to a threshold value of $10.00, and in other aspects, configurable SV threshold value 133 may include any additional or alternate value suitable to or established by POS terminal 122, issuer system 142, acquirer system 162, and/or payment network system 182.

By way of example, if transaction detection module 202 were to determine that the transaction value of the initiated purchase transaction exceeds configurable SV threshold value 133, transaction detection module 202 may determine that the initiated purchase transaction is not an SV purchase transaction. In response to the determination, POS terminal 120 and client device 102 may perform operations that authorize the initiated purchase transaction in accordance with one or more of the conventional EMV transaction authorization and communications protocols described above, and POS terminal 122 may perform operations that clear and settle the authorized purchase transaction using conventional clearance and settlement processes involving the conventional payment rails described above.

Alternatively, if transaction detection module 202 were to determine that the transaction value of the initiated purchase transaction fails to exceeds configurable SV threshold value 133, transaction detection module 202 may determine that the initiated purchase transaction represents an SV purchase transaction, and may generate output data 204 that confirms the determination that the initiated purchase transaction represents the SV purchase transaction. For example, and as described above, the initiated purchase transaction may correspond to the purchase of the cup of coffee for $2.50, and transaction detection module 202 may determine that the transaction value of $2.50 does not exceed configurable SV threshold value 133 of $10.00. Transaction detection module 202 may generate output data 204 confirming that the purchased cup of coffee represents the SV purchase transaction, and as described below, POS terminal 122 may perform operations, in conjunction with client device 102, to identify an SV payment application stored locally by client device 102 and capable of authorizing the initiated SV purchase transaction.

For example, and as described above, client device 102 may store one or more executable payment applications within a locally accessible data repository (e.g., within payment application data 110 of data repository 106). The executable payment applications may include the SV payment application, and additionally or alternatively, may also include one or more EMV payment applications that, when executed by processor 104, authorizes an initiated purchase transaction in accordance with conventional EMV processes, such as those described above. In some instances, each of the stored SV and/or EMV payment applications may be assigned a unique application identifier, e.g., an AID, and with a corresponding application data file, e.g., an ADF, liked to that unique application identifier. The application data files may, in some instances, identify certain elements of terminal-specific and/or other input data requested by client device 102 prior to an execution of corresponding ones of the stored payment applications (e.g., as listed within a processing objects data objects list (PDOL) maintained within each application data file).

In one aspect, an application selection module 206 may receive output data 204, which confirms the initiation of the SV purchase transaction, and may perform application selection processes that determine the unique application identifier assigned to the SV payment application stored locally by client device 102 and select the application data file linked to the determined application identifier. For example, application selection module 206 may determine the application identifier linked to the SV payment application based on a list of candidate application identifiers stored locally by POS terminal 122 and additionally or alternatively, based on successive operations that access and process application-specific data stored by client device 102 in accordance with a known directory structure, e.g., a payment services environment (PSE) supported by client device 102.

In response to the determination of the application identifier linked to the SV payment application, application selection module 206 may generate selection data 208 that incorporates the application identifier linked to the SV payment application and confirms the selection of the application data file associated with the SV payment application. POS terminal 122 may transmit selection data 208 to client device 102 across direct communications channel 120A, e.g., through terminal interface unit 128, using a standard EMV communications protocol, such as an application processing data unit (APDU) communications protocol. In one instance, POS terminal 122 may format selection data 208 (and other data exchanged with client device 102 in order to identify the AID of the SV payment application) in accordance with standard EMV command protocols, e.g., as a SELECT EMV command.

Client device 102 may receive selection data 208 through device interface unit 108, and a selection module 209 of client device 102 may process selection data 208 and extract the application identifier assigned to the SV payment application. Selection module 209 may, in some instances, access payment application data 110 (e.g., stored within data repository 106) and obtain a stored application data file, e.g., SV ADF 210, linked to the extracted application identifier and associated with the selected SV payment application. Selection module 209 may package one or more portions of accessed SV ADF 210, such as the requested terminal-specific and/or other input data (e.g., the PDOL maintained within SV ADF 210), into a selection response 212, which client device 102 may transmit to POS terminal 122 across direct communications channel 120A, e.g., through device interface unit 108, using any of the communications protocol described above.

In one aspect, POS terminal 122 may receive selection response 212 through terminal interface unit 126, and an application initiation module 214 may process selection response 212 to identify the input data (e.g., as specified within the PDOL of SV ADF 210), which POS terminal 122 may provide to client device 102 prior to an execution of the SV payment application by client device 102 and an initiation of SV purchase transaction processing. As described above, the requested input data may include, but is not limited to, certain values of certain terminal parameters that characterize POS terminal 122, such as certain processing, communication, or interface capabilities of POS terminal 122 and a manufacturer, model number, or terminal type associated with POS terminal 122. The disclosed embodiments are not limited these examples of terminal-specific input data, and in other embodiments, selection response 212 may specify any additional or alternate elements of terminal-specific input data, or other input data, requested by client device 102 prior to the initiation of SV processing.

Application initiation module 214 of POS terminal 122 may, in some instances, access terminal data 130 (e.g., as stored within data repository 128), and extract values of terminal parameters 216 that correspond to and satisfy the requested input data. Application initiation module 214 may process and package extracted terminal parameter values 214 into a request 218 to initiate SV purchase transaction processing, which POS terminal device 122 may transmit to client device 102 across direct communications channel 120A. In some instances, request 218 (and other data exchanged with client device 102 during the initiation of SV purchase transaction processing) may be formatted in accordance with conventional EMV command protocols, e.g., as a GET PROCESSING INFO command, and POS terminal 122 may transmit request 218 to client device 102 through terminal interface unit 120 using any of the communications described above.

Client device 102 may receive request 218 to initiate SV purchase transaction processing through device interface unit 108, and an initiation module 220 of client device 102 may process request 218 and confirm that the received terminal parameters values correspond to and satisfy the requested terminal-specific input data (e.g., as specified within the PDOL of SV ADF 210). If initiation module 220 were to establish an inconsistency between the received terminal parameter values and the requested terminal-specific input data, initiation module 220 may perform operations that reject request 218 and forward a response to POS terminal 122 (e.g., across direct communications channel 120A) that confirms the rejection and, in some instances, requests POS terminal 122 transmit additional input data.

In other aspects, if initiation module 220 were to determine that the received terminal parameter values correspond to and satisfy the requested terminal-specific input data, initiation module 220 may access payment application data 110, and may identify and obtain an application interchange protocol (AIP) and application file locator (AFL) linked to the application identifier of the SV payment application, e.g., AIP and AFL 222. As described above, the AIP of the SV payment application may specify certain authentication and verification processes implemented by the SV payment application, and the AFL may identify elements of data that support the execution of the SV payment application and further, locations of these data elements within data repository 106. For example, the AFL for the SV payment application may identify SV block-chain ledger 113, issuer public key certificate 118, and device public key certificate 120, which may be required by POS terminal 122 to authorize the initiated SV purchase transaction, and may include data identifying locations of these required data elements within data repository 106 (e.g., within ledger data 112 and cryptographic data 114). The AFL for the SV payment application may also include identifiers and storage locations of elements of EMV-specific data, which may be required to authorize requested SV load transactions using online EMV authentication processes.

Initiation module 220 may, in some instances, may generate a data package 224 that includes AIP and AFL 222, and client device 102 may transmit data package 224 across direct communications channel 120A to POS terminal 122 (e.g., through device interface unit 108 and using any of the communication protocols described above). POS terminal 122 may receive data package 224 through terminal interface unit 126, and an application data module 226 of POS terminal 122 may parse received data package 224 to obtain identifiers of the required data elements (e.g., SV block-chain ledger 113, issuer public key certificate 118, device public key certificate 120, and the EMV-specific data) and the locations of these required data elements within data repository 106 of client device 102.

In some aspects, application data module 226 may generate one or more requests, e.g., data requests 228, to obtain the required data elements from the corresponding locations within data repository 106, and POS terminal 122 may sequentially transmit each of generated data requests 228 to client device 102 across direct communications channel 120A. For example, each of generated data requests 228 may be formatted in accordance with conventional EMV command protocols, e.g., as READ RECORD commands, and POS terminal device 122 may transmit each of data requests 228 sequentially through terminal interface unit 126 using any of the communications protocols described above. Client device 102 may receive each of sequentially transmitted data requests 228 (e.g., formatted as conventional READ RECORD commands) through device interface unit 108, and a record request module 230 may process each of sequentially received data requests 228 to identify a requested data element and location of that requested data element within data repository 106, to obtain the requested data element from its location within data repository 106, and package the obtained data element into a response for transmission to POS terminal 122, e.g., a corresponding one of responses 232. Client device 102 may transmit the corresponding one of responses 232 to POS terminal 122 across direct communications channel 120A (e.g., through device interface unit 108 using any of the communication protocols described above).

As described above, the application file location of the selected SV payment application may include identifiers and storage locations, among other things, SV block-chain ledger 113, issuer public key certificate 118, device public key certificate 120, and the EMV-specific data associated with certain online EMV authentication processes. In certain aspects, and consistent with the disclosed embodiments, application data module 226 may generate individual data requests (e.g., corresponding ones of data requests 228) to obtain corresponding ones of SV block-chain ledger 113, issuer public key certificate 118, device public key certificate 120, and the EMV-specific data from their respective storage locations within data repository 106. Using any of the processes described above, POS terminal 122 may serially transmit each of the individual data requests to client device 102, and record request module 230 may receive and process each of the individual data requests upon receipt and in sequence to obtain the requested data from data repository 106.

For instance, client device 102 may receive a first one of data requests 228 that identifies SV block-chain ledger 113 and specifies its location within ledger data 112, and in response to the received first data request, record request module 230 may obtain SV block-chain ledger 113 from ledger data 122 and package obtained SV block-chain ledger 113 into a first one of responses 232 for transmission to POS terminal 122. Client device 102 may also receive a second one of data requests 224 that identifies issuer public key certificate 118 and specifies its location within cryptographic data 114, and in response to the received second data request, record request module 230 may obtain issuer public key certificate 118 from cryptographic data 114 and package obtained issuer public key certificate 118 into a second one of responses 232 for transmission to POS terminal 122. Similarly, client device 102 may receive a third one of data requests 228 that identifies device public key certificate 120 and specifies its location within cryptographic data 114, and in response to the third data request, record request module 230 may obtain device public key certificate 120 from cryptographic data 114 and package device public key certificate 120 into a third one of responses 232 for transmission to POS terminal 122.

Finally, and in some instances, client device 102 may receive a fourth one of data requests 228 that identifies the additional EMV-specific data and specifies its location within payment application data 110, and in response to the fourth data request, record request module 230 may obtain the additional EMV-specific data from payment application data 110 and the additional EMV-specific data into a fourth one of responses 232 for transmission to POS terminal 122. The disclosed embodiments are, however, not limited to these examples of sequentially or serially generated and transmitted requests for records, and in other aspects, POS terminal 122 may generate, and client device 102 may process, a data request that identifies multiple elements of data and their respective locations within data repository 106, and additionally ort alternatively, data requests in batch format at corresponding, predetermined temporal intervals.

Referring back to FIG. 2, POS terminal 122 may receive each of responses 232 through terminal interface unit 126, and a storage module 234 may process each of received responses 232 to extract a corresponding one of the respective data elements, which storage module 230 may store within a corresponding portion of data repository 128. For example, and upon receiving and processing the exemplary first, second, third, and fourth responses described above, storage module 230 may store a local copy of SV block-chain ledger 113 within data repository 128, may store respective local copies of issuer and device public key certificates 118 and 120 within cryptographic data 136, and may store a local copy 240 of the requested EMV-specific data. In certain aspects, as described below, POS terminal 122 may access portions of this locally-stored block-chain data, cryptographic data, and/or EMV-specific data and perform operations that verify an identity of client device 102, verity an authenticity of communications exchanged with client device 102, and to authorize, settle, and clear SV purchase transactions initiated at POS terminal 122 in accordance with the disclosed embodiments.

Prior to performing operations to authorize the initiated SV purchase transaction (e.g., the $2.50 purchase of the cup of coffee), POS terminal 122 may process the cryptographic data obtained from client device 102 to verify an identify of client device 102 and an authenticity of data exchanged between client device 102 and POS terminal 122. In one aspect, and in reference to FIG. 3A, an issuer key validation module 302 of POS terminal 122 may access data repository 128 to obtain the local copy of issuer public key certificate 118 and self-signed, payment-network public key certificate 138, and may perform operations that validate the local copy of issuer public key certificate 118 based on portions of payment-network public key certificate 138.

By way of example, issuer public key certificate 118 may include, among other things, a public cryptographic key of issuer system 142 and additional issuer- and/or key-specific data, which includes, but is not limited to, an identifier of the issuer, an expiration date of the key, a certificate serial number, and a hash algorithm indicator. The issuer public key certificate 118 may also include a digital signature generated using a private cryptographic key of payment network system 182 and applied to the contents of the issuer public key certificate 118, e.g., the public cryptographic key of issuer system 142 and the additional issuer- and/or key-specific data. In certain aspects, payment network system 182 may function as a certificate authority for one or more of the devices operating within environment 100, such as issuer system 142, client device 102, and payment network 122.

Issuer key validation module 302 may, in certain aspects, extract the payment-network public cryptographic key from self-signed, payment-network public key certificate 138, and may decode the digital signature of issuer public key certificate 118 to obtain the corresponding issuer public key. Using the corresponding issuer public key, issuer key validation module 302 may re-compute the digital signature of the contents of the issuer public key certificate 118 (e.g., by concatenating the contents of the issuer key certificate and applying a hash algorithm consistent with the hash algorithm indicator to the concatenated contents), and compare the re-computed digital signature against the digital signature applied to issuer public key certificate 118. If the applied and re-computed digital signature fail to match, issuer key validation module 302 may deem the issuer public key certificate 118 invalid (e.g., due to an expired key, corruption or fraud, etc.), and POS terminal 122 may decline to authorize the initiated SV purchase transaction. Alternatively, when the re-computed digital signature corresponds to the digital signature applied to the issuer public key certificate 118, issuer key validation module 302 may deem the issuer public key certificate 118 valid, and may output data 304 that includes the validated issuer public key.

Figure 3A:
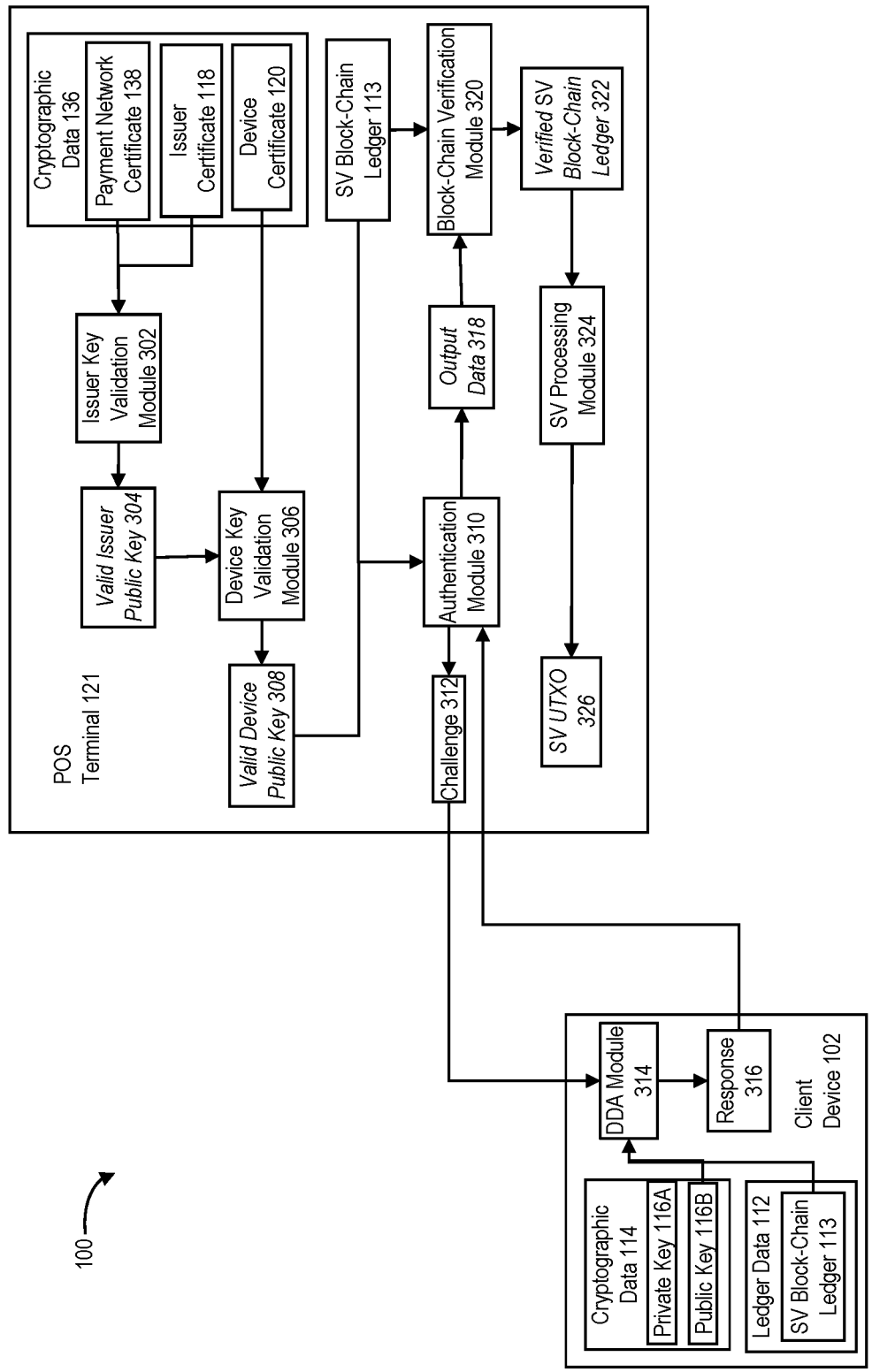

In further aspect, a device key validation module 306 may perform operations that validate device public key certificate 120 based on the now-validated issuer public key. For example, as illustrated in FIG. 3A, device key validation module 306 may receive output data 304, which includes the validated issuer public key, and may access data repository 128 to obtain the locally stored copy of device public key certificate 120. By way of example, device public key certificate 120 may include, among other things, a public cryptographic key of client device 102 and additional data that may include, but is not limited to, an expiration date of the key, a certificate serial number, and a hash algorithm indicator. In certain aspects, device public key certificate 120 may also include a digital signature generated using the private cryptographic key of issuer system 142 and applied to the contents of the device public key certificate 120, e.g., the public cryptographic key of client device 102 and the additional data described above.

Device key validation module 306 may, in certain aspects, extract the validated issuer public key from output data 304, and may decode the digital signature applied to device public key certificate 120 to obtain the corresponding device public key. Using the corresponding device public key, device key validation module 306 may re-compute the digital signature of the contents of the device public key certificate 120 (e.g., by concatenating the contents of the device key certificate and applying a hash algorithm consistent with the hash algorithm indicator to the concatenated contents), and compare the re-computed digital signature against the digital signature applied to device public key certificate 120. If the applied and re-computed digital signature fail to match, device key validation module 306 may deem device public key certificate 120 invalid (e.g., due to an expired key, corruption or fraud, etc.), and POS terminal 122 may decline to authorize the initiated SV purchase transaction. Alternatively, when the re-computed digital signature corresponds to the digital signature applied to the device public key certificate 120, device key validation module 302 may deem the device public key certificate 120 valid, and may output data 308 that include the validated device public key.

In response to the successful validation of issuer public key certificate 118 and device public key certificate 120, POS terminal device 122 and client device 102 may perform operations that verify and confirm, to POS terminal 122, that SV block-chain ledger 113 is generated by client device 102, and not a counterfeit clone of client device 102. For example, these verification processes may include, but are not limited to, secure, EMV-based dynamic data authentication (DDA) processes that include, within a list of participating elements, contents of SV block-chain ledger 113 along with a corresponding challenge value (e.g., a random number generated by POS terminal 122). In certain aspects, an authentication module 310 of POS terminal 122 may receive output data 308, which includes the validated device public key, and may implemented one or of the secure, EMV-based DDA processes to generate a POS terminal challenge 312 that identifies the list of participating data elements (e.g., the contents of SV block-chain ledger 113) and the POS challenge value. POS terminal challenge 312 may, in certain instances, be formatted in accordance with conventional EMV command protocols, e.g., as an INTERNAL AUTHENTICATE EMV command with the contents of SV block-chain ledger 113 and the POS challenge being inputs, and POS terminal 122 may transmit POS terminal challenge 312 to client device 102 through terminal interface unit 120 using any of the communications described above.

Client device 102 may receive POS terminal challenge 312 through device interface unit 108, and a DDA module 314 of client device 102 may process POS terminal challenge 112, extract the POS challenge value and list of participating data elements incorporated within POS terminal challenge 312, and generate a device response 316 for transmission to POS terminal device 122. For example, and as described above, the list of participating data elements included within POS terminal challenge 312 may identify SV block-chain ledger 113 as a component of device response 316. In certain aspects, DDA module 314 may access data repository 106, obtain SV block-chain ledger 113 (e.g., as stored within ledger data 112), and incorporate the POS challenge value (e.g., as extracted from POS terminal challenge 312) and obtained SV block-chain ledger 113 into device response 316. Further, in additional aspects, DDA module 314 may concatenate the contents of device response 106 and apply a digital signature to the concatenated contents using device private cryptographic key 116A (e.g., by executing a conventional Digital Signature Scheme Giving Message Recovery algorithm on processor 104). Client device 102 may transmit device response 316 to POS terminal 122 across direct communications channel 120A (e.g., through terminal interface unit 120 using any of the communications described above).

POS terminal 122 may receive device response 316 through terminal device unit 126, and authentication module 310 may process device response 316 to verify an authenticity of the contents of device response 316, e.g., SV block-chain ledger 113 and the POS challenge value. For example, authentication module 310 may decode the digital signature applied to device response 316 using now-validated device public key 308, and perform operations that extract the POS challenge value and the copy of SV block-chain ledger 111 from decoded device response 316. Authentication module 310 may also perform operations to confirm that the extracted POS challenge value corresponds to the POS challenge value incorporated into POS terminal challenge 312 and further, to confirm that the extracted copy of SV block-chain ledger 113 corresponds to the locally stored copy of SV block-chain ledger 113 (e.g., as maintained within data repository 128), which POS terminal 122 incorporated into POS terminal challenge 316.

If authentication module 310 were to determine that the extracted POS challenge value fails to correspond to the POS challenge value incorporated into POS terminal challenge 312, or that the extracted copy of SV block-chain ledger 113 fails to correspond to the locally stored copy of SV block-chain ledger 113, POS terminal 122 may decline to authorize the initiated SV purchase transaction. Alternatively, when the extracted POS challenge value corresponds to the POS challenge value incorporated into POS terminal challenge 312, and the extracted copy of SV block-chain ledger 113 corresponds to the locally stored copy, POS terminal 122 may determine that SV block-chain ledger 113, as locally stored in data repository 128, is generated by client device 102, and not by a counterfeit clone of client device 102, and may generate output data 318 confirming the determination.

Figure 3B:
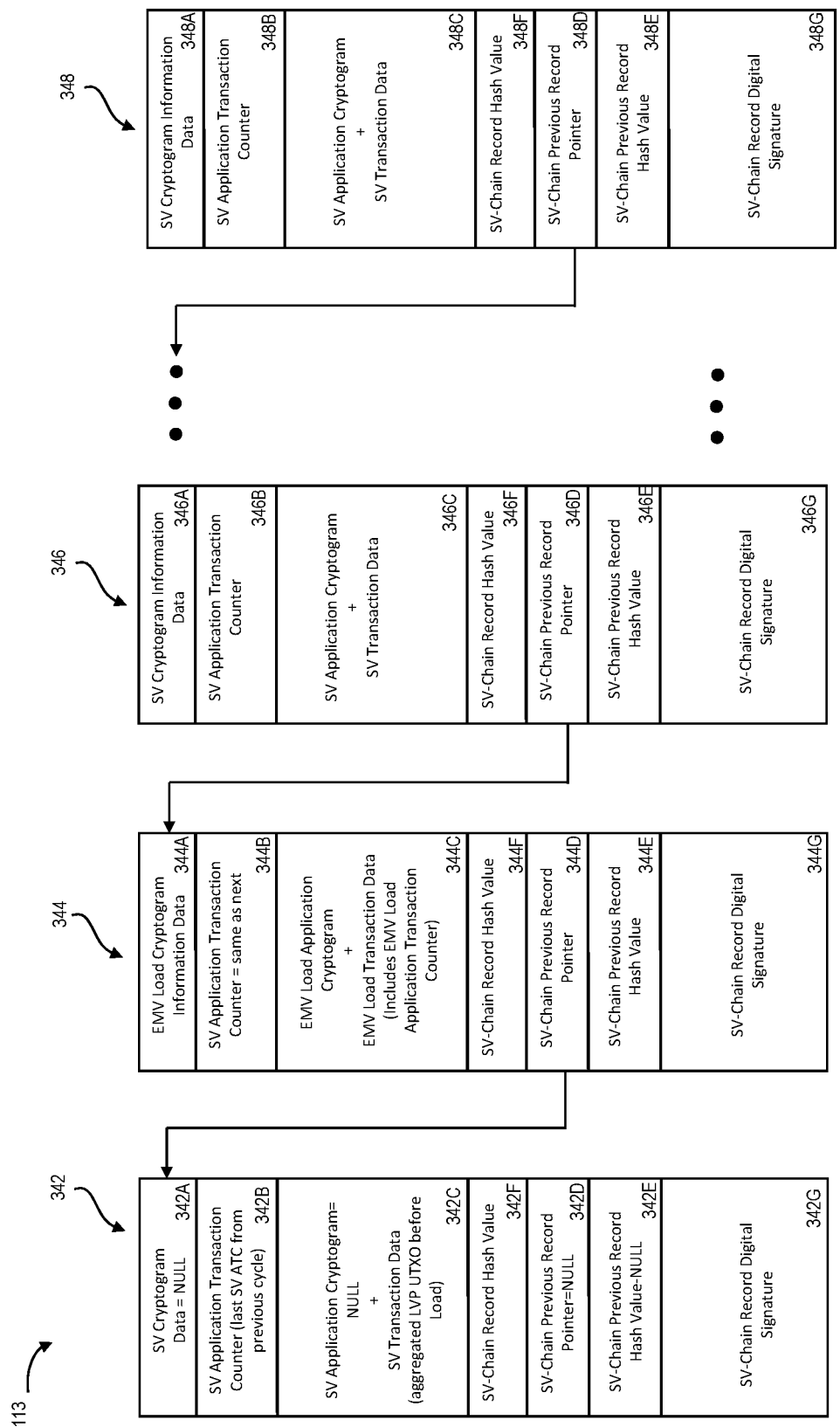
FIG. 3B illustrates an exemplary distributed ledger data structure, in accordance with the disclosed embodiments.

In some aspects, a block-chain verification module 320 may receive output data 318, and based on the determination that SV block-chain ledger 113 is generated by client device 102 (e.g., and not by a malicious, counterfeit clone), block-chain verification module 320 may perform operations that verify an integrity of the ledger blocks included within SV block-chain ledger 113, an exemplary portion of which is illustrated in FIG. 3B. For example, and in reference to FIG. 3B, SV block-chain ledger 113 includes an SV genesis block 342, an SV load transaction block 344, and one or more successive SV purchase transaction blocks, such as SV purchase transaction blocks 346 and 348, and in some aspects, may establish a current transaction cycle initiated by an authorized SV load transaction represented by SV load transaction block 344. By way of example, the current transaction cycle terminates when an outstanding balance of funds loaded onto client device 102 by the authorized SV load transaction represented by SV load transaction block 344 (as reduced by successive, authorized SV purchase transactions represented by SV purchase transaction blocks 346 and 348) is insufficient for use in a new SV purchase transaction initiated at POS terminal 122 and involving client device 102.

In some instances, SV genesis block 342 may specify a remaining balance of funds loaded onto client device 102 during a prior transaction cycle. SV load transaction block 344 may be linked to SV genesis block 342 and may specify additional funds credited to and loaded onto client device 102 during the authorized SV load transaction (e.g., a value loaded or credited to client device 102 and available to fund SV purchase transactions). Further, and by way of example, SV purchase transaction blocks 346 and 348 represent and reflect corresponding authorized SV purchase transactions involving client device 102, each of which consume a respective portion of the loaded funds and decrease a balance of these funds available for use in future SV purchase transactions.

In one instance, and as described below, the SV load transaction represented by SV load transaction block 344 may be triggered when a transaction value of an SV purchase transaction initiated at POS terminal 122 and involving client device 102 exceeds a current balance of loaded funds available for use in SV purchase transactions involving client device 102. In other instances, and consistent with the disclosed embodiments, client device 102, POS terminal 122, and/or issuer system 142 may perform operations that initiate and authorize SV load transactions, such as the SV load transaction represented by SV load transaction block, at predetermined intervals or in response to certain transaction characteristics, such as a velocity of SV purchase transactions involving client device 102 and the associated payment instrument account held by user 101. Further, described in terms of SV purchase transaction blocks 346 and 348, SV block-chain ledger 113 may include any additional or alternate number of SV purchase transaction blocks, which successively reduce an available balance of the funds loaded onto client device 102 by the SV load transaction represented by SV load transaction block 344.

Referring back to FIG. 3B, each of SV genesis block 342, SV load transaction block 344, and SV purchase transaction blocks 346 and 348 may be structured in accordance with a common SV block structure. For example, as illustrated in FIG. 3B, SV genesis block 342 may include an SV genesis block header 342A and an SV purchase transaction counter 342B. In one instance, SV genesis block header 342A may include a null value, as SV genesis block 342 identifies a remaining balance of funds loaded onto client device 102 during the prior transaction cycle, and SV purchase transaction counter 342B may reference a transaction counter of a final SV purchase transaction block within the prior transaction cycle (e.g., the last SV purchase transaction authorized before the SV load transaction represented by SV load transaction block 344).

SV genesis block 342 may also include a body portion 342C that includes a null value representative of the payment application cryptogram and specifies the remaining balance of funds loaded onto client device 102 during the prior transaction cycle (e.g., an aggregated, SV unspent transaction output (UTXO) during the prior transaction cycle). Further, SV genesis block 342 may include a prior block pointer 342D and a hash pointer value 342E, which may be assigned null values, and a genesis block hash value 342F that includes a hash value generated by an application of an appropriate hash algorithm to certain concatenated contents of SV genesis block 342 (e.g., SV genesis block header 342A, SV purchase transaction counter 342B, body portion 342C, prior block pointer 342D, and hash pointer value 342E). Genesis block 342 may also include a digital signature 342G, which may be applied to SV genesis block 342 using private cryptographic key 116A of client device 102.

Further, and by way of example, SV load transaction block 344 may include an SV load transaction block header 344A that includes information associated with an EMV application cryptogram generated by issuer system 142 during the authorization of the SV load transaction, and an SV purchase transaction counter 344B. SV load transaction block 344 may also include a body portion 344C that includes the EMV load transaction cryptogram generated by issuer system 142 during the authorization of the SV load transaction, and details specifying the authorized SV load transaction, including a value of the additional funds loaded onto client device 102. Further, SV load transaction block 344 also includes: a prior block pointer 344D that references SV genesis block header 342A of prior SV genesis block 342; a hash pointer value 344E that includes a hash value of the concatenated contents of prior SV genesis block 342 (e.g., as computed by client device 102 during generation of SV load transaction block 344); and a block hash value 344F that includes a hash value of certain concatenated contents of SV load transaction block 344 (e.g., SV block header 344A, SV purchase transaction counter 344B, body portion 344C, prior block pointer 344D, and hash pointer value 344E). SV load transaction block 344 may also include a digital signature 344G, which may be applied SV load transaction block 344 using private cryptographic key 116A of client device 102.

As further illustrated in FIG. 3B, SV purchase transaction block 346 may include an SV purchase transaction block header 346A that includes information associated with an SV payment application cryptogram generated by client device 102 during an offline authorization of the SV purchase transaction, and an SV purchase transaction counter 346B (which may be identical to SV purchase transaction counter 344B of SV load transaction block 344). SV purchase transaction block 346 may also include a body portion 346C that includes the SV payment application cryptogram and details specifying the authorized SV purchase transaction, including a transaction value of the authorized SV purchase transaction. Further, SV purchase transaction block 346 also includes: a prior block pointer 346D that references SV load transaction block header 346A of prior SV load transaction block 344; a hash pointer value 346E that includes a hash value of the concatenated contents of prior SV purchase transaction load block 344 (e.g., as computed by client device 102 during generation of SV purchase transaction block 346); and a block hash value 346F that includes a hash value of certain concatenated contents of SV purchase transaction block 346 (e.g., SV block header 346A, SV purchase transaction counter 346B, body portion 346C, prior block pointer 346D, and hash pointer value 346E). SV purchase transaction block 346 may also include a digital signature 346G, which may be applied to SV purchase transaction block 346 using private cryptographic key 116A of client device 102.

Additionally, as illustrated in FIG. 3B, SV purchase transaction block 348 may include an SV block header 348A, an SV purchase transaction counter 348B, a body portion 348C, a prior block pointer 348D, a hash pointer value 348E, a block hash value 348F, and a digital signature 348G. These exemplary components of SV purchase transaction block 348 are similar in structure and function to comparable components described above in reference to SV purchase transaction block 346.

Referring back to FIG. 3A, block-chain verification module 320 may access the hash pointer values included within each of the load and SV purchase transaction blocks of SV block-chain ledger 113 (e.g., hash pointer values 344E, 346E, and 348E of SV load transaction block 344, SV purchase transaction block 346, and SV purchase transaction block 348). In some aspects, block-chain verification module 320 may process SV block-chain ledger 113 to re-compute the hash pointer values for each of SV load transaction block 344, SV purchase transaction block 346, and SV purchase transaction block 348, and verify the integrity of SV block-chain ledger 113 through a comparison of hash pointer values 344E, 346E, and 348E against corresponding ones of the re-computed hash value pointers.

For example, in verifying the integrity of SV block-chain ledger 113, block-chain verification module 320 may access SV purchase transaction block 346, compute a hash value of the concatenated contents of SV purchase transaction block 346, and compare that computed hash value against hash pointer value 348E to verify the integrity of SV purchase transaction block 348. Similarly, block-chain verification module 320 may access SV load transaction block 344, compute a hash value of the concatenated contents of SV load transaction block 344, and compare that computed hash value against hash pointer value 346E to verify the integrity of SV purchase transaction block 346. Finally, block-chain verification module 320 may access SV genesis block 342, compute a hash value of the concatenated contents of SV genesis block 342, and compare that computed hash value against hash pointer value 344E to verify the integrity of SV purchase transaction block 344. The disclosed embodiments are not limited to these exemplary SV purchase transaction blocks, and in further embodiments, the exemplary block-chain verification processes described herein may be applied to any additional or alternate number or type of SV purchase transaction blocks included within SV block-chain ledger 113.

If block-chain verification module 320 were to establish a variation between one or more of hash pointer values 344E, 346E, and 348E and corresponding ones of the re-computed hash value points, block-chain verification module 320 may decline to verify the integrity of SV block-chain ledger 113, and POS terminal 122 may decline the initiated SV purchase transaction. In other instances, if block-chain verification module 320 were to determine that each of hash pointer values 344E, 346E, and 348E exactly match the corresponding ones of the re-computed hash value points, block-chain verification module 320 may verify the integrity of SV block-chain ledger 113, and may output verification data 322 that includes now-verified SV block-chain ledger 113.

In some aspects, an SV processing module 324 of POS terminal 122 may receive verification data 322, and perform operations that compute a balance of the funds loaded onto client device 102 during the current transaction cycle, e.g., an SV unspent transaction output (UTXO) available to fund the initiated SV purchase transaction. By way of example, SV processing module 324 may access now-verified SV block-chain ledger 113, may obtain an aggregated SV UTXO associated with a prior transaction cycle from SV genesis block 342 (e.g., a remaining balance of funds loaded onto client device 102 during the prior transaction cycle), an amount of funds loaded onto client device 102 during the current transaction cycle from SV load transaction block 344 (e.g., funds transferred by issuer system 142 from user 101's payment instrument account to the SV float account during the current transaction cycle), and transaction values associated with the authorized SV purchase transactions represents by SV purchase transaction blocks 346 and 348.

For instance, SV processing module 324 may establish that the aggregated SV UTXO from the prior transaction cycle corresponds to $0.50 (e.g., based on body portion 342C of SV genesis block 342), may determine that issuer system 142 credited $10.00 to client device 102 during the current transaction cycle (e.g., based on body portion 344C of SV load transaction block 344), and further, may determine that the authorized SV purchase transactions represents by SV purchase transaction blocks 346 and 348 debited $1.00 and $4.00, respectively, from the available and loaded funds during the current transaction cycle (e.g., based on body portions 346C and 348C of SV purchase transaction blocks 346 and 348). In some aspects, SV processing module 324 may compute the current value of the SV UTXO as a sum of the aggregated SV UTXO from the prior funding cycle and the funds credited to client device during the current cycle (e.g., $0.50+$10.00=$10.50), as reduced by those funds debited through SV purchase transactions authorized during the current transaction cycle (e.g., $1.00+$4.00=$5.00). For example, SV processing module 324 may determine that the current SV UTXO corresponds to a value of $5.50 (e.g., $10.50-$5.50), and may output UTXO data 326 that identifies the current value of the SV UTXO.

Figure 4A:
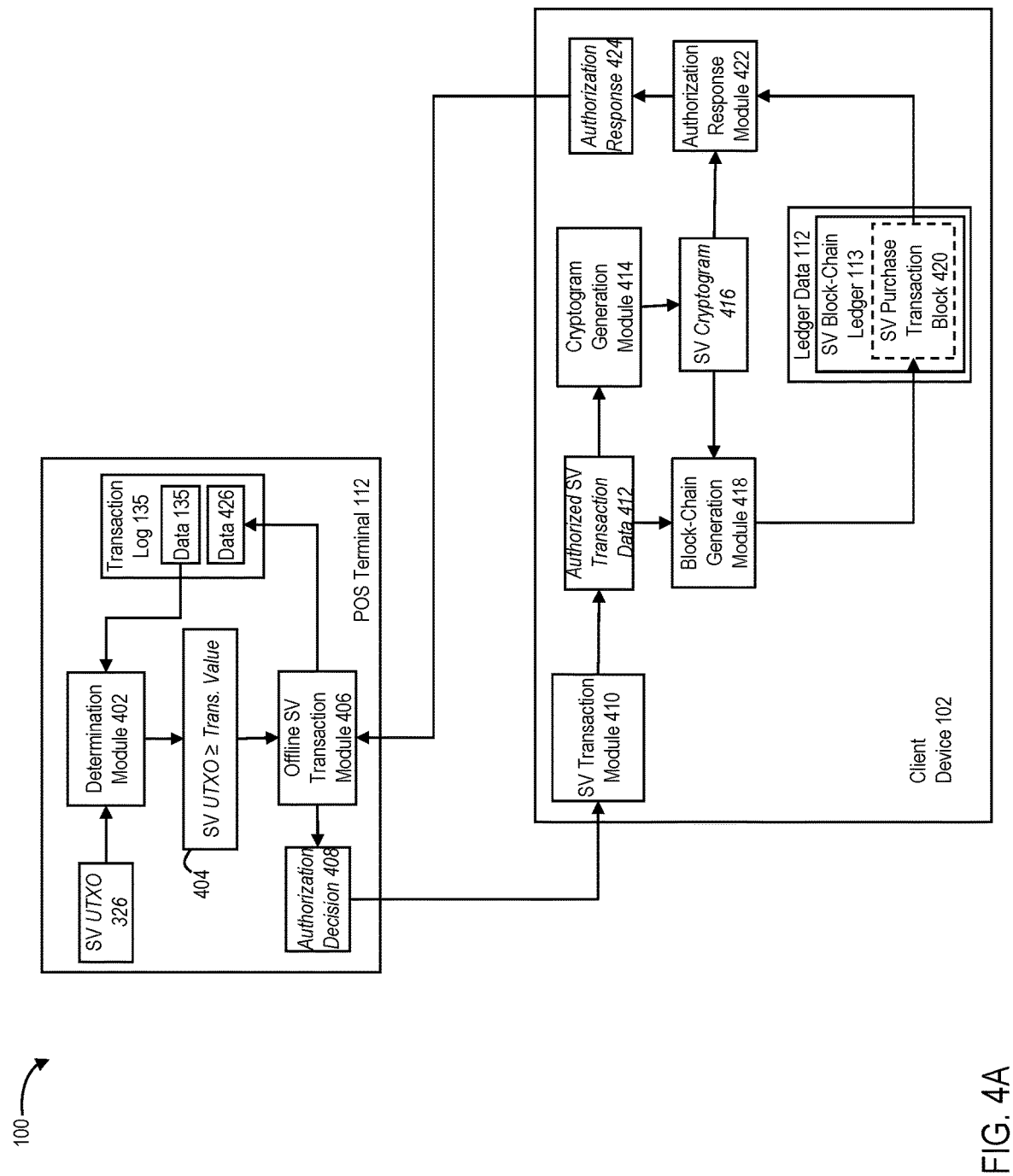
FIG. 4A illustrates a portion of an exemplary computing environment, in accordance with the disclosed embodiments.

Referring to FIG. 4A, a determination module 402 of POS terminal 122 may receive UTXO data 326, which includes the current value of the SV UTXO available to fund the initiated SV purchase transaction (e.g., the purchase of the $2.50 cup of coffee from merchant 121), may access data repository 128 and obtain initiated SV purchase transaction data 135 (e.g., as maintained within transaction log 134). As described above, initiated SV purchase transaction data 135 may specify certain details of the initiated purchase transaction, such as the transaction value of $2.50 and/or an identifier of the purchased cup of coffee. In certain aspects, and based on UTXO data 326 and initiated SV purchase transaction data 135, determination module 402 may compare the SV UTXO for the current transaction cycle against the transaction value of the initiated SV purchase transaction. Based on outcome of the comparison, determination module 402 may determine whether to initiate an offline process to authorize the initiated SV purchase transaction, e.g., the purchase of the $2.50 cup of coffee from merchant 121, without input from issuer 142 or alternatively, an online authorization process authorizes the initiated SV purchase transaction and that loads additional funds consistent with a predetermined or adaptively determined transfer amount onto client device 102.

For example, and as described above, the SV UTXO for the current transaction cycle may correspond to $5.50, and the transaction value of the initiated purchase transaction may correspond to $2.50. SV determination module 402 may determine that the $5.50 SV UTXO for the current transaction cycle exceeds the $2.50 transaction value, and may generate output data 404 that confirms the determination that the current SV UTXO exceeds the transaction value. In an embodiment, the determination that the SV UTXO exceeds the transaction confirms that the funds loaded onto client device 102 are sufficient and available for use in the initiated SV purchase transaction, as issuer system 142 transferred the loaded funds from the payment instrument account of user 101 to the SV float account, which funds authorized SV purchase transaction during settlement and clearance.

In certain aspects, offline SV authorization module 406 may receive output data 404, and based on the confirmation that the current SV UTXO exceeds the transaction amount, offline SV authorization module 406 may determine to authorize the initiated SV purchase transaction in accordance with certain exemplary offline SV authentication processes described herein, and may generate an authorization decision 408 that reflects the determination to authorize the initiated SV purchase transaction offline and without further input from issuer system 142. In one instance, authorization decision 408 may include transaction data characterizing the initiated transaction, such as the transaction value (e.g., $2.50) and the product identifier (e.g., the UPC of the cup of coffee), additional or alternate data identifying the authorized SV purchase transaction (e.g., a transaction counter of the authorized SV purchase transaction, a transaction time or date, etc.), and/or data identifying POS terminal 122 (e.g., a location of POS terminal 122, a device identifier, etc.). In further instances, authorization decision 408 may also include data specifying the basis for the offline authorization of the initiated SV purchase transaction, e.g., data confirming that the current SV UTXO exceeds the transaction value of the initiated SV purchase transaction.

In certain instances, authorization decision 408 may be formatted in accordance with one or more EMV command protocols, e.g., a standard GENERATE AC command that requests client device 102 generate an application cryptogram indicative of the offline authorization. POS terminal 122 may transmit authorization decision 408 to client device 102 across direct communications channel 120A, e.g., through terminal interface unit 126 using any of the communications protocols described above.

Client device 102 may receive authorization decision 408 through device interface unit 108, and a SV transaction module 410 may perform operations that confirm POS terminal 122's determination to authorize the initiated SV purchase transaction offline and without input from issuer system 142. In response to the confirmed offline authorization, SV transaction module 410 may generate authorized transaction data 412 that characterizes the authorized SV purchase transaction and includes, but is not limited to, the transaction value (e.g., $2.50), the product identifier (e.g., the UPC of the cup of coffee), additional or alternate data identifying the authorized SV purchase transaction (e.g., a transaction counter of the authorized SV purchase transaction, a transaction time or date, etc.), and additionally of alternatively, data identifying POS terminal 122 (e.g., a location of POS terminal 122, a device identifier, etc.).

In one aspect, a cryptogram generation module 414 of client device 102 may receive authorized transaction data 412, which confirms the offline authorization of the initiated SV purchase transaction, and may perform operations that generate and output an SV payment application cryptogram 416 appropriate to the offline authorization of the initiated SV purchase transaction. For instance, SV payment application cryptogram 416 may be structured in accordance with an EMV transaction certificate, which reflects a successful offline authorization of an initiated transaction within conventional EMV authorization processes. The disclosed embodiments are, however, not limited to these exemplary cryptogram structures, and in other aspects, SV payment application cryptogram 416 may incorporate any additional or alternate cryptogram appropriate to client device 102, associated with the offline authorization, and recognizable by POS terminal 122.

Figure 4B:
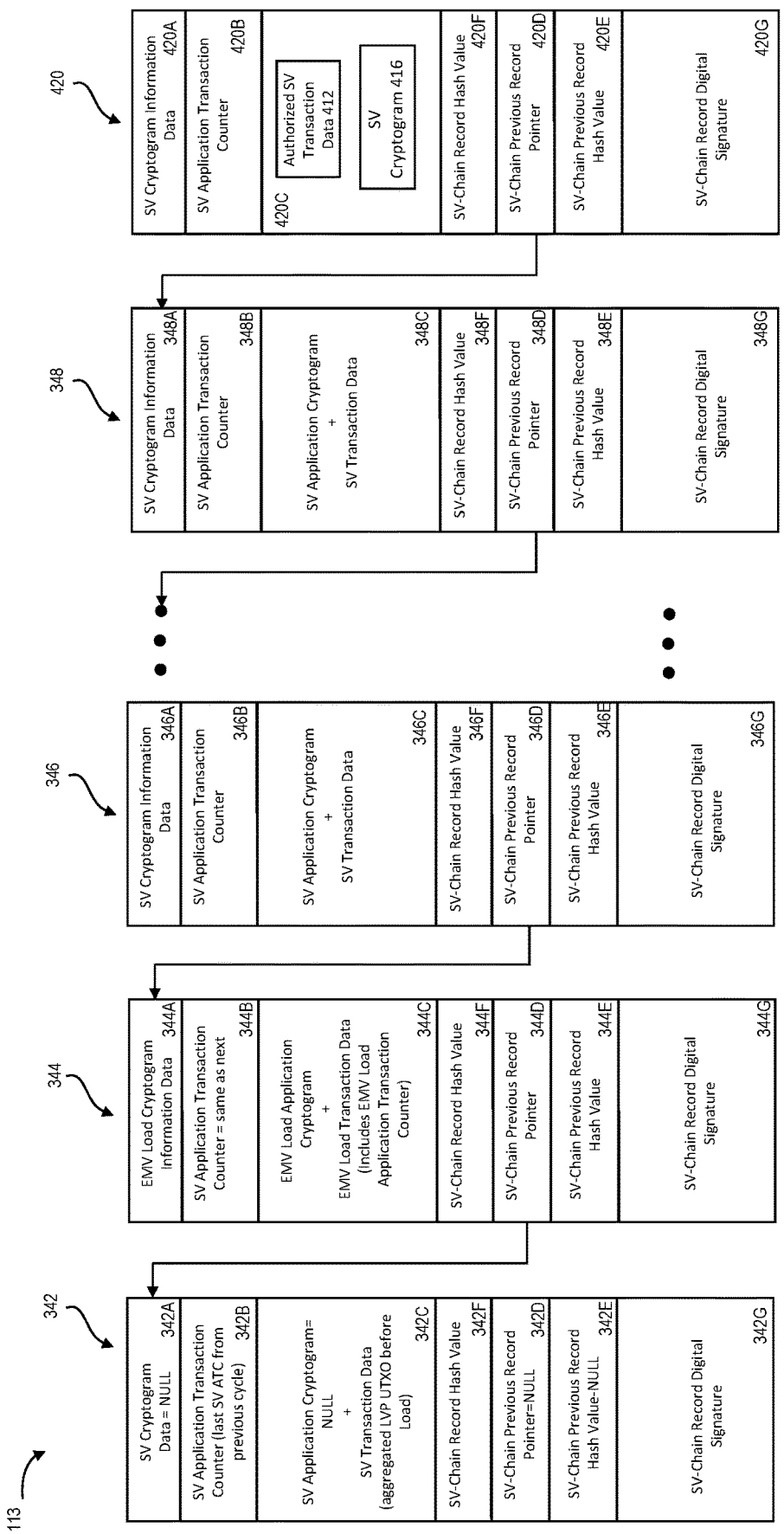
FIG. 4B illustrates an exemplary distributed ledger data structure, in accordance with the disclosed embodiments.

In further aspects, a block-chain generation module 418 of POS terminal 122 receives authorized transaction data 412 and SV payment application cryptogram 416, and may perform operations that generate a new SV purchase transaction block that represents the now-authorized SV purchase transaction (e.g., the purchase of the $2.50 cup of coffee from merchant 121), which block-chain generation module 418 may append to SV block-chain ledger 113 and link to the prior SV purchase transaction blocks included within SV block-chain ledger 113 using any of the exemplary processes described above. For example, and in reference to FIG. 4B, new SV purchase transaction block 420 may be appended to SV block-chain ledger 113 and linked SV purchase transaction block 348, which represents an SV purchase transaction that involves client device 102 and occurred immediately prior to the now-authorized SV purchase transaction.

In one instance, and as described above, block-chain generation module 418 may generate and populate an SV purchase transaction block header 420A of new SV purchase transaction block 420 with information identifying SV payment application cryptogram 416, and may generate and populate an SV purchase transaction counter 420B with data identifying the transaction counter output by the SV payment application executed by client device 102. Additionally, block-chain generation module 418 may generate and populate a body portion 420C of new SV purchase transaction block 420 with authorized transaction data 412 (e.g., which characterized and described the newly authorized SV purchase transaction) and SV payment application cryptogram 416, and may generate and populate a prior block pointer 420D of new SV purchase transaction block 420 with data that references SV purchase transaction block header 348A of prior SV purchase transaction block 348.

Further, and as described above, block-chain generation module 418 may perform operations that apply an appropriate hash algorithm to the concentrated contents of prior SV purchase transaction block 348 to generate a corresponding hash value, which block-chain generation module 418 may assign to hash pointer value 420E of new SV purchase transaction block 420. Additionally, and in certain instances, block-chain generation module 418 may also apply the appropriate hash algorithm to certain concatenated contents of new SV purchase transaction block 420 (e.g., SV block header 420A, SV purchase transaction counter 420B, body portion 420C, prior block pointer 420D, and hash pointer value 420E), and block-chain generation module 418 may assign a resulting hash value, which represents portions of new SV purchase transaction block 420, to a block hash value 420F included within new SV purchase transaction block 420. Finally, block-chain generation module 418 may generate and apply a digital signature to new SV purchase transaction block 420 using private cryptographic key 116A of client device 102.

Referring back to FIG. 4A, an authorization response module 422 of client device 102 may also receive application cryptogram 416, which confirms the offline authorization of the initiated SV purchase transaction by client device 102, and may package application cryptogram 416 and additional data indicative of the offline authorization into an authorization response 424. In one aspect, authorization response module 422 may incorporate new SV purchase transaction block 420, which includes application cryptogram 416 and additional data, into authorization response 424. Client device 102 may transmit authorization response 424 to POS terminal 122 across direct communications channel 120A, e.g., through device interface unit 108 using any of the communications protocols described above.

In some aspects, POS terminal 122 may receive authorization response 424 through terminal interface unit 126, and offline SV purchase transaction module 416 may process authorization response 424, verify an authenticity of SV payment application cryptogram 416 and its generation by client device 102, and based on SV payment application cryptogram 416, determine that client device 102 confirmed the offline authorization of the initiated SV purchase transaction (i.e., the authorization decision of POS terminal 122). Offline SV purchase transaction module 416 may also store authorized SV purchase transaction data 426 characterizing the now-authorized SV purchase transaction, e.g., new SV purchase transaction block 420, within transaction log 134. As described below, POS terminal 122 may perform operations that submit portions of authorized SV purchase transaction data 426 to acquirer system 162 for clearance and settlement in near-real time by payment network system 182.

In certain embodiments, described above, POS terminal 122 and client device 102 perform operations that authorize an initiated SV purchase transaction offline and without input from issuer system 142 when a remaining balance of funds credited to client device 102 for use in SV purchase transactions (e.g., the current value of the SV UTXO available to fund the initiated SV purchase transaction) exceeds a transaction value that characterizes the initiated SV purchase transaction. As described above, the determined validity and integrity of SV block-chain ledger 113, and the liquid nature of the funds credited to client device 102 by issuer system 142, the disclosed embodiments may enable POS terminal 122 to authorize the initiated SV transaction without recourse to the computationally inefficient and uncertain risk assessment processes applied to transaction data during the performance of conventional offline EMV authorization processes.

In other embodiments, however, the current value of the SV UTXO may be insufficient to fund a subsequent SV purchase transaction involving client device 102 and initiated at POS terminal 122 or at other POS terminal devices operating within environment 100. For example, and after purchasing the $2.50 cup of coffee from merchant 121, user 101 may return to merchant 121 to purchase lunch for an agreed-upon price of $4.00. User 101 may, in some instances, elect to provide payment for the $4.00 lunch using the payment instrument account linked to the SV payment application stored within the one or more tangible, non-transitory memories of client device 102 (e.g., within payment application data 110 of data repository 106), and client device 102 may establish direct communications channel 102A with POS terminal 122 using any of the exemplary mechanisms described above.

For example, and as described above, POS terminal 122 may receive transaction data characterizing the newly initiated transaction, such as a transaction amount of $4.00, and may determine that the newly initiated transaction represents an SV purchase transaction (e.g., that the $4.00 transaction value fails to exceed configurable SV threshold value 133). POS terminal 122 may perform any of the exemplary processes described above to verify the validity of issuer public key certificate 118, and device public key certificate 120, as received from client device 102 across direct communications channel 120A. Further, using any of the exemplary processes described above, POS terminal 122 may receive a latest, longest version of SV block-chain ledger 113 (e.g., which includes newly generated SV purchase transaction block 420) from client device 120, may verify and confirm that SV block-chain ledger 113 is generated by client device 102 (and not a counterfeit clone of client device 102), and may verify an integrity of each hash value pointer included within the SV load transaction blocks ant SV purchase transaction blocks of SV block-chain ledger 113.

Further, upon successful completion of these verification processes, POS terminal 122 may process SV block-chain ledger 113 to determine a current balance of the funds loaded onto client device 102 during the current transaction cycle and available for use in new SV purchase transactions, e.g., a current value of the SV UTXO, using any of the exemplary processes described above. For example, and as described above, the SV UTXO value prior to authorization of the $2.50 initiated SV purchase transaction corresponds to $5.50, and the offline authorization of that $2.50 SV purchase transaction reduces that SV UTXO value to $3.00. In certain aspects, as described below, the $4.00 transaction value of the initiated SV purchase transaction may exceed the current value of the SV UTXO available to fund initiated SV purchase transactions, and POS terminal 122 and client device 102 may perform operations that, in conjunction with issuer system 142, perform one or more EMV-based online authorization processes to authorize a requested SV load transaction and load funds designated for use in SV purchase transactions onto client device 102.

Figure 5A:
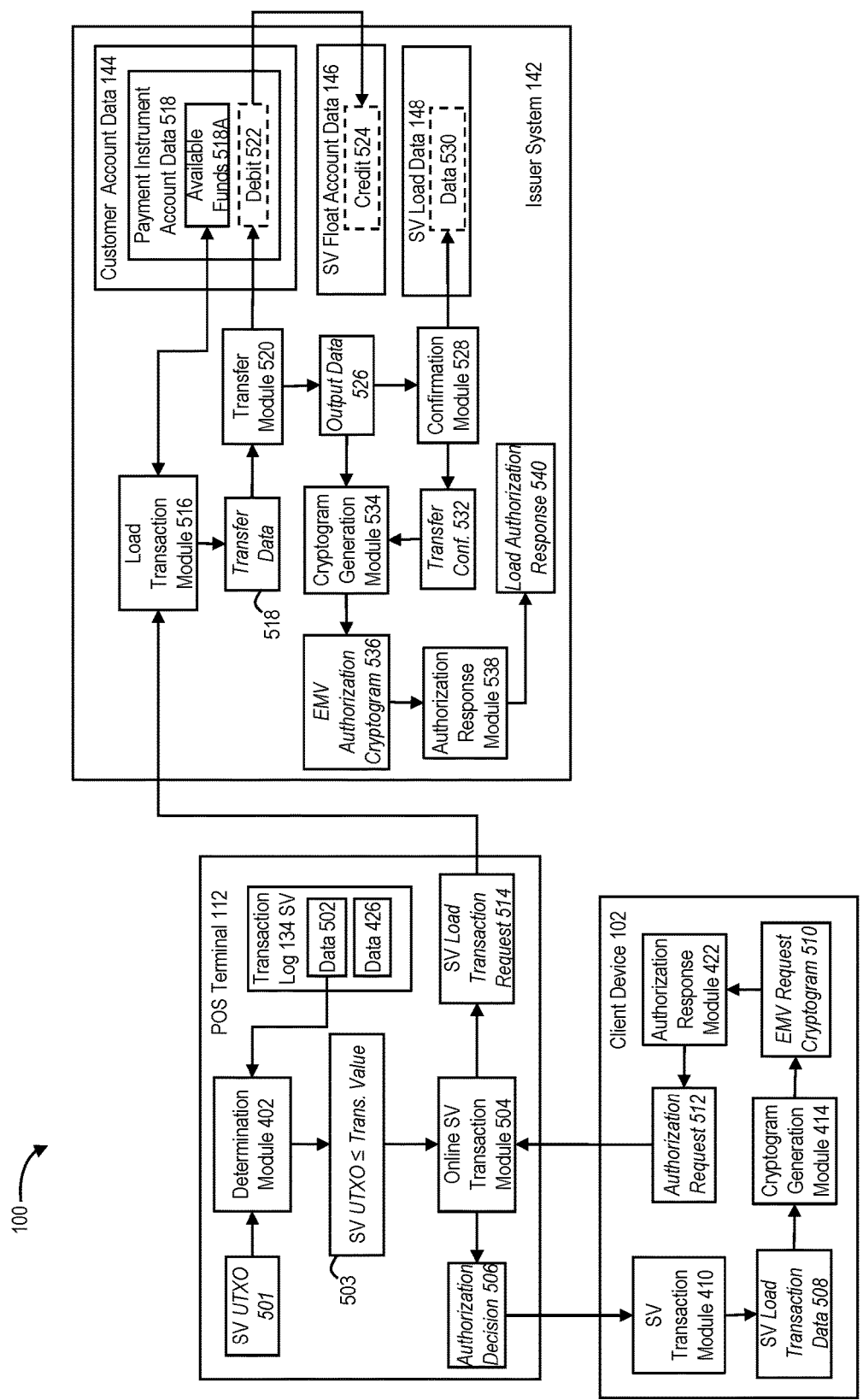
FIGS. 5A and 5B illustrate portions of an exemplary computing environment, in accordance with the disclosed embodiments.

Referring to FIG. 5A, determination module 402 may receive data 501 that identifies the current value of the SV UTXO (e.g., as generated by SV processing module 326 using any of the exemplary processes described herein), and may access data repository 128 and obtain initiated SV purchase transaction data 502, which includes data characterizing the newly initiated SV purchase transaction (e.g., the transaction value). For example, and as described above, current SV UTXO value corresponds to $3.00, and the transaction value of the newly initiated SV purchase transaction (e.g., the purchase of lunch from merchant 121) corresponds to $4.00. SV determination module 402 may determine that the $4.00 transaction value exceeds the $3.00 SV UTXO for the current transaction cycle, and may generate output data 503 that confirms the determination that the transaction value exceeds the current SV UTXO. In certain aspects, online SV transaction module 504 may receive output data 503, and based on the confirmation that the transaction amount (e.g., $4.00) exceeds the current SV UTXO (e.g., $3.00), online SV transaction module 504 may elect to initiate an online, EMV-based authentication of an SV load transaction that, in conjunction with client device 102, enables issuer system 142 to transfer additional funds from the payment instrument account of user 101 to the maintained SV float account and, as described below, load these additional funds onto client device 102 for use in the newly initiated SV purchase transaction.

In response to the decision to initiate the online authentication of the SV load transaction, POS terminal 122 generate an authorization decision 506 that reflects the determination to initiate the SV load transaction and corresponding online authentication process. In one instance, authorization decision 506 may include transaction data characterizing the newly initiated SV purchase transaction, such as the transaction value (e.g., $2.50) or the product identifier (e.g., the UPC of the lunch), and/or data identifying POS terminal 122 (e.g., a location of POS terminal 122, a device identifier, etc.). In further instances, authorization decision 506 may also include data specifying the basis for the initiated SV load transaction and corresponding online authorization, e.g., data confirming that the transaction value of the initiated SV purchase transaction exceeds the current SV UTXO.

Authorization decision 506 may, in some instances, be formatted in accordance with one or more conventional EMV command protocols, e.g., a standard GENERATE AC command that requests client device 102 generate an EMV application cryptogram requesting an online, EMV-based authorization of an SV load transaction by issuer system 142. POS terminal 122 may transmit authorization decision 506 to client device 102 across direct communications channel 120A, e.g., through terminal interface unit 126 using any of the communications protocols described above.

Client device 102 may receive authorization decision 506 through device interface unit 108, and SV transaction module 410 may perform operations that confirm the determination of POS terminal 122 to initiate the online EMV-based authentication of the SV load transaction, and that generate SV load transaction data 508 specifying and characterizing the initiated SV load transaction and requested online EMV-based authorization, which includes, but is not limited to, the transaction value (e.g., $4.00), the product identifier (e.g., the UPC of the lunch), and/or data identifying POS terminal 122 (e.g., a location of POS terminal 122, a device identifier, etc.). In one aspect, cryptogram generation module 414 may receive SV load transaction data 508, which confirms the requested online authorization of the initiated SV load transaction, and may perform operations that generate and output an EMV application cryptogram 510 consistent with the requested EMV-based online authorization of the SV load transaction.

EMV application cryptogram 510 may, in some instances, correspond to an EMV payment application cryptogram indicative of the requested online EMV-based authorization of the SV load transaction (e.g., an authorization request cryptogram (ARQC) generated in accordance with one or more EMV authorization protocols). The disclosed embodiments are, however, not limited to these exemplary cryptogram structures, and in other aspects, EMV application cryptogram 510 may incorporate any additional or alternate cryptogram appropriate to client device 102, associated with the offline authorization, and recognizable by POS terminal 122.

In one aspect, authorization response module 422 of client device 102 may receive EMV application cryptogram 510, which confirms the requested online authorization of the SV load transaction, and may package application cryptogram 508, and additional data indicative of the requested online authorization of the SV load transaction, into authorization request data 512. Client device 102 may transmit authorization request data 512 to POS terminal 122 across direct communications channel 120A, e.g., through device interface unit 108 using any of the communications protocols described above.

In some aspects, POS terminal 122 may receive authorization request data 512 through terminal interface unit 126, and online SV purchase transaction module 504 may process authorization request data 512 and verify an authenticity of EMV application cryptogram 510 and its generation by client device 102. Based on the verification of EMV application cryptogram 510, SV purchase transaction module 504 may generate an SV load transaction request 514, which includes EMV application cryptogram 510 and additional data specifying the newly initiated SV purchase transaction (such as, but not limited to, the $4.00 transaction value) and/or the current value of the SV UTXO (e.g., the $3.00). POS terminal 122 may transmit SV load transaction request 514 across network 130B to issuer system 142, e.g., through communications unit 125C using any of the communications protocols described above.

Issuer system 142 may receive SV load transaction request 512 through a corresponding interface unit (not depicted in FIG. 5A), and a load transaction module 516 of issuer system 142 may process SV load transaction request 512 to extract EMV application cryptogram 508, and to verify an authenticity of EMV application cryptogram 510 and its generation by client device 102. Further, based on the verification of EMV application cryptogram 510, issuer system 142 may establish an amount of funds (e.g., a transfer amount) within the payment instrument account of user 101 that are suitable for transfer into the SV float account maintained by issuer system 142.

In one aspect, the load transaction module 516 may elect to transfer a predetermined amount of funds (e.g., a predetermined transfer amount) from the payment instrument account to the SV float account in response to SV load transaction requests received from POS terminal 122 and generated by client device 102, e.g., SV load transaction request 514. For example, the predetermined transfer amount may correspond to the configurable threshold transaction value (e.g., $10.00), or may correspond to a specific multiple of that configurable threshold transaction value (e.g., a multiple of five or ten, resulting in a pre-determined funds amount of $50.00 or $100.00). The predetermined transfer amount may, in certain instances, be specified by user 101 (e.g., by accessing a digital portal maintained by issuer system 140 using an appropriate communications device) or alternatively, by issuer system 142, acquirer system 162, and/or payment network system 182. The disclosed embodiments are, however, not limited to predetermined transfer amounts, and in other aspects, load transaction module 516 may determine the transfer amount adaptively based on, among other things, the current value of the SV UTXO, the transaction value, the configurable threshold transaction value, account parameters of user 101's payment instrument account, or a history of prior authorized SV load transaction (e.g., as maintained within SV load data 148).

Upon determination of the transfer amount, load transaction module 514 may access payment instrument account data 518 maintained by issuer system 142 within the one or more tangible, non-transitory memories (e.g., within consumer account data 144), identify funds 518A available in the payment instrument account for use in purchase transactions (e.g., an amount of credit available in the payment instrument account), and determine whether the amount of credit available in the payment instrument account exceeds or is equivalent to the transfer amount (e.g., is sufficient to transfer funds equivalent to the transfer amount from the payment instrument account of user 101 to the SV float account). In one aspect, if load transaction module 514 were to determine that the amount of available credit exceeds or is equivalent to the transfer amount, load transaction module 514 may authorize the requested SV load transaction and output transfer data 519, which includes the determined transfer amount, to a transfer module 520, which may perform operations that transfer funds consistent with the transfer amount from the payment instrument account of user 101 to the SV float account maintained by issuer system 142.

For example, load transaction module 514 may establish that user 101's payment instrument account supports a transfer amount of $10.00, and based on transfer data 519, transfer module 520 may perform operations that generate debit data 522 indicative of the transfer of $10.00 from the payment instrument account of user 101, and store generated debit data 522 within a portion of payment instrument account data 518. Further, transfer module 520 may perform additional operations that generate credit data 524 indicative of the transfer of $10.00 into the SV float account, and store generated credit data 524 within a portion of SV float account data 146, e.g., to increment the aggregated balance of the SV float account to reflect that transfer.

In response to a successful completion of the transfer from the payment instrument account of user 101 to the SV float account, issuer system 142 may authorize the requested SV load operation, and transfer module 520 may generate output data 526 that includes details of the now-completed transfer, which designates the funds transferred from the payment instrument account of user 101 as being available for use in SV purchase transactions. Output data 526 may include, but is not limited to, the transfer amount (e.g., $10.00), account numbers and other account data specifying a source account (e.g., the payment instrument account of user 101) and a target account (e.g., the SV float account) for the transfer, and transaction details of the transfer, such as a transaction date or a transaction time. A confirmation module 528 may receive output data 526 and in some instances, may store and record a portion of output data 526 within SV load data 148, e.g., as authorized SV purchase transaction data 530.

In other instances, confirmation module 528 may generate a transfer confirmation 532, which confirmation module 528 may provide to a cryptogram generation module 534 of issuer system 142, which may generate and output an application cryptogram 536 indicative of the authorized SV load transaction. Application cryptogram 536 may, in some instances, correspond to EMV authorization cryptogram indicative of the authorized SV load transaction (e.g., an authorization response cryptogram (ARC) generated in accordance with one or more EMV authorization protocols). The disclosed embodiments are, however, not limited to these exemplary cryptogram structures, and in other aspects, application cryptogram 536 may incorporate any additional or alternate cryptogram appropriate to issuer system 142, associated with the online EMV-based authorization of the requested SV load transaction, and recognizable by client device 102 and POS terminal 122.

In one aspect, an authorization response module 538 of issuer system 142 may receive application cryptogram 536, which confirms the authorization of the requested SV load transaction, and may package application cryptogram 536, and additional data characterizing the confirmed and completed transfer, e.g., the $10.00 transfer amount and other transaction details, into authorization response 540. Issuer system 140 may transmit authorization response 540 to POS terminal 122 across network 120B using any of the exemplary communications protocols described above.

Figure 5B:
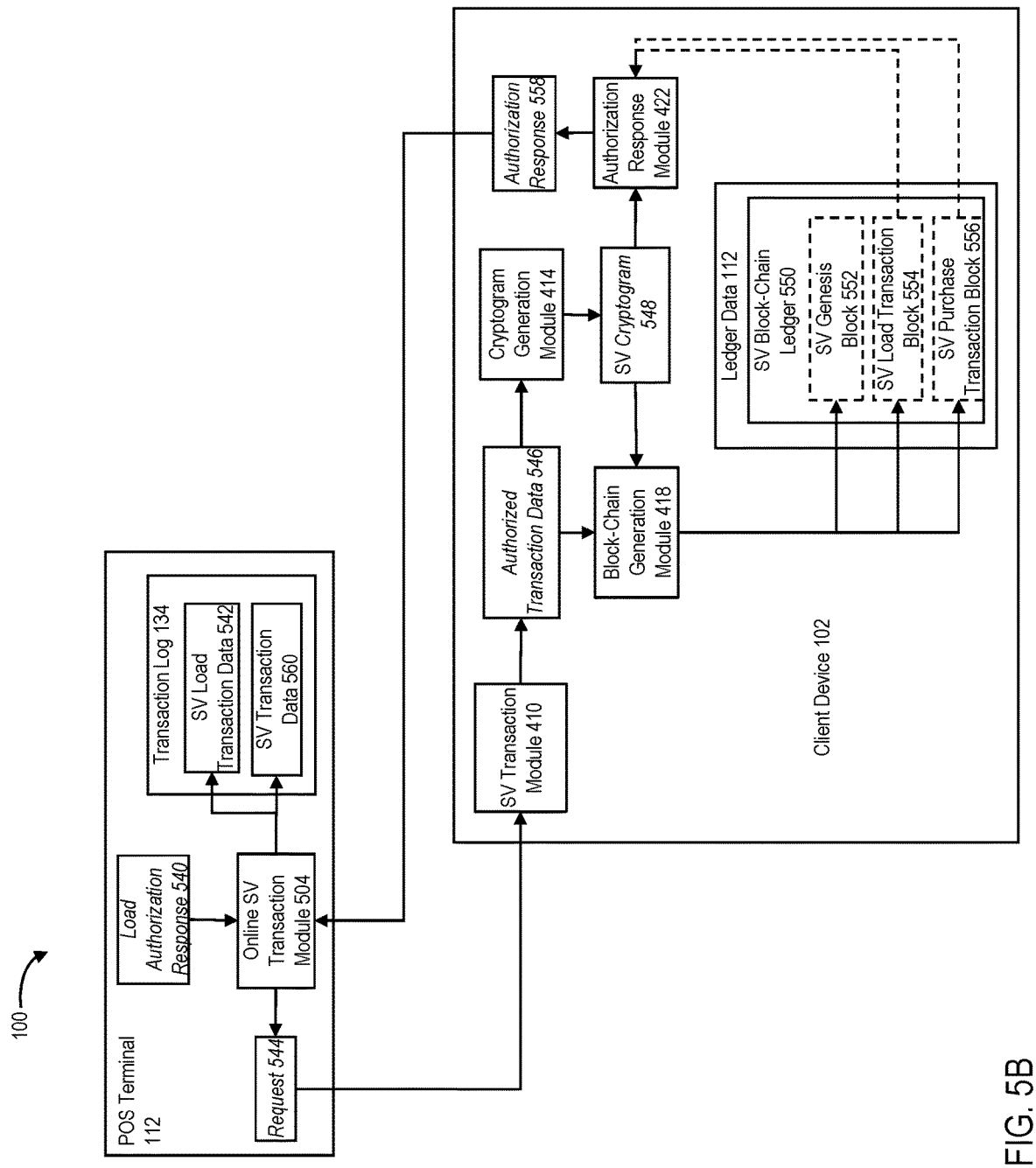

Referring to FIG. 5B, POS terminal 122 may receive load authorization response 540 through communications unit 125C, and online SV purchase transaction module 504 may process load authorization response 540, verify an authenticity of application cryptogram 536 and its generation by issuer system 142, and based on application cryptogram 536 and authorization response 540, determine that issuer system 142 authorized the requested SV load transaction and effected the transfer of funds (e.g., the $10.00 transfer amount). In response to the determination, online SV purchase transaction module 504 may store data characterizing the authorized SV load transaction, such as the $10.00 transaction amount and certain transaction details included within authorization response 540, within data repository 128, e.g., as authorized SV load transaction data 542.

In further aspects, online SV purchase transaction module 504 may package portions of authorization response 540, including application cryptogram 536 and certain transaction details (such as the $10.00 transfer amount) into a request 544 to complete the newly initiated SV purchase transaction (e.g., the purchase of the $4.00 lunch from merchant 121) in view of the SV load transaction authorized and effected by issuer system 142. As described above, issuer system 142 authorized the requested SV load transaction through the completed transfer of the $10.00 transfer amount from the payment instrument account of user 101 to the SV float account maintained by issuer system 142, and request 544 may also include additional or alternate data specific to the SV payment application.

In some aspects, request 544 may be formatted in accordance with one or more conventional EMV command protocols, such as the standard GENERATE AC described above, and POS terminal 122 may transmit request 544 across direct communications channel 120A, e.g., through terminal interface unit 126 using any of the communications protocols described above. Further, by transmitting the second standard GENERATE AC to client device 102, POS terminal 122 may, in certain instances, request that client device 102 perform operations that effect an offline authorization of the newly initiated SV purchase transaction in view of the completed transfer of the $10.00 transfer amount from the payment instrument account of user 101 to the SV float account.

Client device 102 may receive request 544 through device interface unit 108, and SV transaction module 410 may process received request 544, verify an authenticity of application cryptogram 536 and its generation by issuer system 142, and perform operations that confirm the determination (by POS terminal 122) to authorize the initiated SV purchase transaction in view of the authorized SV load transaction (e.g., the completed transfer of the $10.00 from the payment instrument account of user 101 to the SV float account). As described above, the authorized SV load transaction, and the corresponding completed transfer, may load funds consistent with the transfer amount (e.g., $10.00) onto client device 102 for use in initiated SV purchase transactions, and in some aspects, SV transaction module 410 may authorize the initiated SV purchase transaction in response to a determination that the $10.00 loaded onto client device 102 by issuer system 142 increases the value of the SV UTXO from $3.00 to $13.00, which exceeds the $4.00 transaction value of the initiated SV purchase transaction (e.g., the purchase of the $4.00 lunch from merchant 121).

In response to this determination, SV purchase transaction module 412 may generate authorized SV purchase transaction data 546 that characterizes the authorized SV purchase transaction and includes, but is not limited to, the transaction value (e.g., $4.00), the product identifier (e.g., the UPC of the lunch), additional or alternate data identifying the authorized SV purchase transaction (e.g., a transaction counter of the authorized SV purchase transaction, a transaction time or date, etc.), and additionally of alternatively, data identifying POS terminal 122 (e.g., a location of POS terminal 122, a device identifier, etc.). SV purchase transaction data 546 may also include data specifying the value of the SV UTXO prior to the authorization of the requested SV load transaction (e.g., $3.00) and additional data that specifies the authorized SV load transaction, which may include including EMV application cryptogram 536, the transfer amount, and other transfer details.

In one aspect, cryptogram generation module 414 may receive authorized SV purchase transaction data 546, which confirms the decision to authorize the newly initiated SV purchase transaction in view of the loaded funds, and may perform operations that generate and output an SV payment application cryptogram 548 appropriate to the authorized SV purchase transaction. For instance, SV payment application cryptogram 548 may be structured in accordance with an EMV transaction certificate, which reflects a successful offline authorization of an initiated transaction. The disclosed embodiments are, however, not limited to these exemplary cryptogram structures, and in other aspects, SV payment application cryptogram 416 may incorporate any additional or alternate cryptogram appropriate to client device 102, associated with the offline authorization, and recognizable by POS terminal 122.

In further aspects, block-chain generation module 418 of POS terminal 122 receives authorized SV purchase transaction data 546 and SV payment application cryptogram 548, and may perform operations that to initiate a new transaction cycle and generate a new SV block-chain ledger 550 in response to the authorized SV load transaction (e.g., through which issuer system 142 transferred funds consistent with the transfer amount from the payment instrument account of user 101 to the SV float account). In reference to FIG. 5B, and to initiate the new transaction cycle, block-chain generation module 418 may generate a new SV genesis block 552, which reflects the value of the SV UTXO prior to the authorized SV load transaction, a new SV load transaction block 554, which reflects the funds loaded onto client device 102 through the authorized SV load transaction, and a new SV purchase transaction block 556, which authorized SV purchase transaction that triggered the request for the SV load transaction.

In certain aspects, new SV genesis block 552, new SV load transaction block 554, and new SV purchase transaction block 556 may be structured in accordance with any of the exemplary SV purchase transaction block structures described above (e.g., SV genesis block 342, SV load transaction block 344, and SV purchase transaction block 346), and block-chain generation module 418 may incorporate these new ledger blocks into SV block-chain ledger 550 for the new transaction cycle. Further, an upon generation of SV block-chain ledger 550 for the new transaction cycle, client device 102 may be loaded with funds consistent with the transfer amount (e.g., $10.00), and these loaded funds are available for use in SV purchase transactions initiated by client device 102 at POS terminal 122 and at other POS terminals operating within environment 100.

Figure 5C:
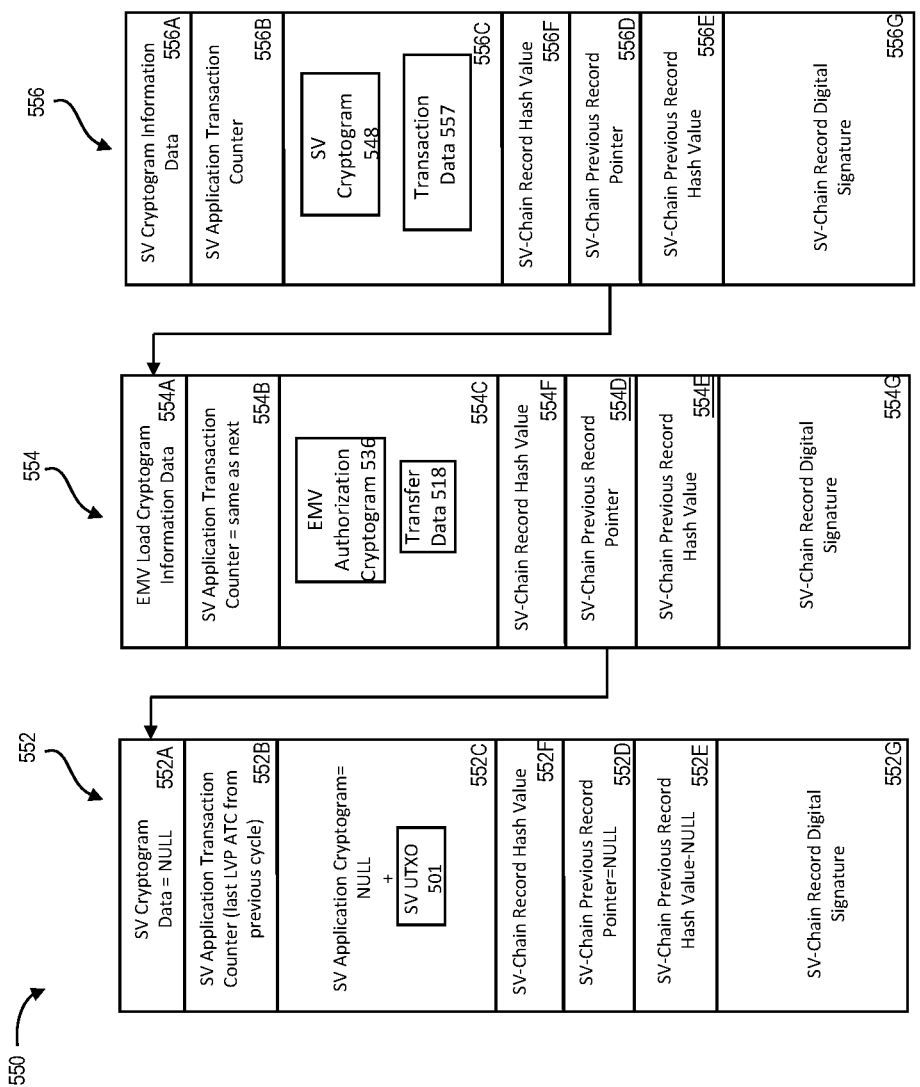
FIG. 5C illustrates an exemplary distributed ledger data structure, in accordance with the disclosed embodiments.

In certain aspects, and in reference to FIG. 5C, SV genesis block 552 may include an SV genesis block header 552A, an SV purchase transaction counter 552B, a body portion 552C, a prior block pointer 552D, a hash pointer value 552E, a block hash value 552F, and a digital signature 552G. These exemplary components of SV genesis 552 are similar in structure and function to comparable components described above in reference to SV genesis block 342 of SV block-chain ledger 113. For example, and as illustrated in FIG. 5C, SV purchase transaction counter 552B may reference an SV purchase transaction counter of a final SV purchase transaction block within the prior transaction cycle (e.g., SV purchase transaction counter 348B of SV purchase transaction block 348, as illustrated in FIG. 3B), and each of SV genesis block header 552A, prior block pointer 552D, and hash pointer value 552E may be assigned null values. Body portion 552C includes a null value representative of the payment application cryptogram and includes a portion of data 501, which identifies the value of the SV UTXO prior to the authorized SV load transaction (e.g., $3.00). As described above, genesis block hash value 552F includes a hash value of certain concatenated contents of SV genesis block 352, and client device 102 may apply digital signature 552G to the concatenated contents of SV genesis block 552 using private cryptographic key 116A of client device 102.

In further reference to FIG. 5C, SV load transaction block 554 may include an SV block header 554A, an SV purchase transaction counter 554B, a body portion 554C, a prior block pointer 554D, a hash pointer value 554E, a block hash value 554F, and a digital signature 554G. These exemplary components of SV load transaction block 554 are similar in structure and function to comparable components described above in reference to SV load transaction block 344 of SV block-chain ledger 113. For example, as illustrated in FIG. 5C, SV block header 554A includes information associated with the EMV load application cryptogram (e.g., EMV application cryptogram 536) generated by issuer system 142 during the authorization of the SV load transaction. Body portion 554C includes, for example, application cryptogram 536 and transfer data 518 (e.g., the transfer amount of $10.00) associated with the authorized SV purchase transaction, which loaded funds consistent with the transfer amount onto client device 102. In further aspects, prior block pointer 544D that references SV genesis block header 552A of prior SV genesis block 552, and block-chain generation module 418 may generate a hash pointer value 544E that includes a hash value of the concatenated contents of prior SV genesis block 552. As described above, block hash value 554F includes a hash value of certain concatenated contents of SV load transaction block 554, and client device 102 may apply digital signature 554G to the concatenated contents of SV load transaction block 554 using private cryptographic key 116A of client device 102.

In additional aspects, and in reference to FIG. 5C, SV purchase transaction block 556 may include an SV block header 556A, an SV purchase transaction counter 556B, a body portion 556C, a prior block pointer 556D, a hash pointer value 556E, a block hash value 556F, and a digital signature 556G. These exemplary components of SV load transaction block 556 are similar in structure and function to comparable components described above in reference to SV load transaction block 556 of SV block-chain ledger 113. For example, SV purchase transaction block header 546A includes information associated with SV payment application cryptogram 548, and SV purchase transaction counter 546B may be identical to SV purchase transaction counter 544B of SV load transaction block 544). In further instances, body portion 346C includes SV payment application cryptogram 548 and a portion of authorized SV purchase transaction data 546, e.g., transaction data 557, that specifies details of the authorized SV purchase transaction, including the $4.00 transaction value of the purchased cup of coffee. Prior block pointer 546D may, in some aspects, reference SV block header 544A of prior SV load transaction block 544, and client device 102 may generate a hash pointer value 546E that includes a hash value of the concatenated contents of prior SV purchase transaction load block 544. As described above, block hash value 556F includes a hash value of certain concatenated contents of SV purchase transaction block 556, and client device 102 may apply digital signature 556G to the concatenated contents of SV load transaction block 554 using private cryptographic key 116A of client device 102.

Referring back to FIG. 5B, authorization response module 422 of client device 102 may also receive application cryptogram 548, which confirms the authorization of the initiated SV purchase transaction (e.g., the $4.00 purchase of the cup of coffee from merchant 121) in view of the funds loaded onto client device 102, and may package SV payment application cryptogram 548 and additional data characterizing the authorized SV purchase transaction (e.g., the transaction value, the product identifier, etc.) into an authorization response 558. In one aspect, authorization response 558 may include new SV purchase transaction block 556, which includes the SV payment application cryptogram 548 and additional data indicative of the authorized SV purchase transaction, and new SV load transaction block 554, which represents the authorized SV load transaction that facilitated the newly authorized SV purchase transaction. Client device 102 may transmit authorization response 558 to POS terminal 122 across direct communications channel 120A, e.g., through device interface unit 108 using any of the communications protocols described above.

In some aspects, POS terminal 122 may receive authorization response 558 through terminal interface unit 126, and online SV purchase transaction module 504 may process authorization response 558, verify an authenticity of SV payment application cryptogram 548 and its generation by client device 102, and based on SV payment application cryptogram 548, determine that client device 102 confirmed the authorization of the initiated SV purchase transaction in view of the loaded funds (e.g., the $4.00 purchase of the cup of coffee from merchant 121). Online SV purchase transaction module 504 may also store SV payment application cryptogram 548 and/or portions of the SV purchase transaction data (e.g., the transaction value, the product identifier, etc.), as authorized SV purchase transaction data 560 within transaction log 134.

In one aspect, and as described above, authorization response 558 may include new SV purchase transaction block 556 (which includes SV payment application cryptogram 548 and the SV purchase transaction data portions), and online SV purchase transaction module 504 may store new SV purchase transaction block 555 as authorized SV purchase transaction data 560. In further aspects, authorization response 558 may also include new SV load transaction block 554, which includes EMV application cryptogram 536 and the SV load transaction data described above, and online SV purchase transaction module 504 may store new SV load transaction block 554 within authorized SV load transaction data 542. As described below, POS terminal 122 may perform operations that submit portions of SV load transaction data 542 and authorized SV purchase transaction data 560 to acquirer system 162 for clearance and settlement in near-real time by payment network system 182.

In certain embodiments, issuer system 142 authorizes a requested SV load transaction when an amount of available credit exceeds or is equivalent to a predetermined or adaptively determined transfer amount. In other embodiments, if load transaction module 514 were to determine that the amount of available credit fails to exceed or be equivalent to the transfer amount, load transaction module 516 may decline the requested SV load transaction. In some aspects, cryptogram generation module 534 may generate an additional application cryptogram indicative of the declined SV load transaction (e.g., the EMV-based authorization response cryptogram described above), which authorization response module 538 may package into an appropriate response (not depicted in FIG. 5A or 5B) for transmission to POS terminal 122 using any of the processes described above.

In certain aspects, online SV transaction module 504 may receive the appropriate response and based on the decision by issuer system 142 to decline the SV load transaction, online SV transaction module 504 may elect to decline the initiated SV purchase transaction (e.g., the $4.00 purchase of lunch from merchant 121), and forward the additional EMV application cryptogram indicative of the declined SV load transaction as an authorization decision that declines the initiated SV purchase transaction (not depicted in FIG. 5A or 5B). As described above, the authorization decision may be formatted in accordance with one or more conventional EMV command protocols, such as the standard GENERATE AC described above. Upon receipt of the request, client device 102 may determine to decline the initiated transaction, and forward a confirmation of the declined transaction and an appropriate SV payment application cryptogram to POS terminal 122 across direct communications channel 130A, as described above.

Using the exemplary processes described above, POS terminal 122 may perform operations that authorize, in real-time, an initiated SV purchase transaction involving client device 102 based on an SV block-chain ledger that tracks a current balance of funds loaded onto client device 102 by issuer system 142 during a current transaction cycle. Client device 102 may, in some instances, generate and maintain the SV block-chain ledger during the current transaction cycle and during future transaction cycles, and by ensuring the immutability of the current balance through the cryptographically secure block-chain structure, client device 102 may freely transmit the latest, longest version of the SV block-chain ledger to POS terminal 122 freely across a direct communications channel, such as direct communications channel 120A. In certain embodiments, and as described below, POS terminal 122 may submit data characterizing one or more of these authorized SV purchase transactions, e.g., as stored within transaction log 134 of data repository 128, to acquirer system 162 for clearance and settlement by payment network system 182 in near-real time, and without the delays associated with conventional processes for clearing and settling authorized EMV transactions.

Figure 6:
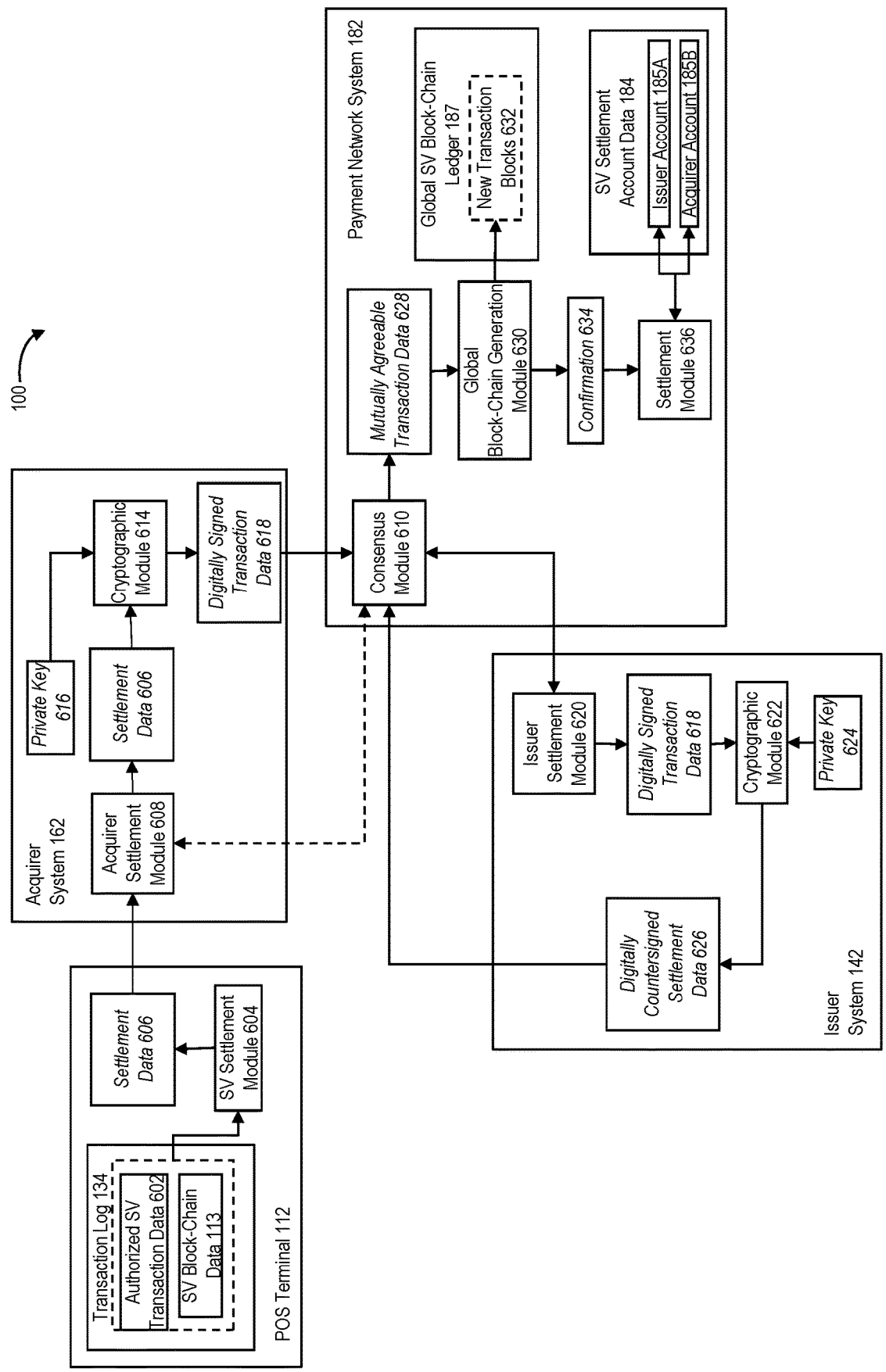
FIG. 6 illustrates a portion of an exemplary computing environment, in accordance with the disclosed embodiments.

Referring to FIG. 6, POS terminal 122 may store, within transaction log 134 of data repository 128, data 602 that identifies and characterizes authorized SV purchase transactions and additionally or alternatively, authorized SV load transactions that facilitate one or more of the authorized SV purchase transactions. For example, and as described above, data 602 may include an SV purchase transaction block representative of an SV purchase transaction authorized using the exemplary offline authentication processes described above (e.g., new SV purchase transaction block 420, which may be stored within authorized SV purchase transaction data 426).

In other instances, data 602 may include an SV load transaction block representing an authorized SV load transaction, and a corresponding SV purchase transaction block representing an SV purchase transaction that triggered the SV load transaction (e.g., new SV load transaction block 554 stored within authorized SV load transaction data 542, and new SV purchase transaction block 556 stored within authorized SV purchase transaction data 560). The disclosed embodiments are, however, not limited to these examples of authorized SV purchase transaction data, and in other aspects, data 602 may include any additional or alternate data characterizing authorized SV purchase transactions that would be appropriate for clearance and settlement by payment network system 182.

In one aspect, a settlement module 604 of POS terminal 122 may access a portion of data 602 corresponding to an authorized SV purchase transaction (e.g., new SV purchase transaction block 420 and/or new SV load transaction block 554 in combination with new SV purchase transaction block 556), and may package the access portion of data 602 into settlement data 606. POS terminal 122 may format settlement data 606 in accordance with one or more standardized messaging protocols, e.g., ISO 8583, or customized protocols, and POS terminal 122 may transmit settlement data 606 across network 120B to acquirer system 162 using any of the communications protocols described above. In certain instances, and consistent with the disclosed embodiments, settlement module 604 may transmit settlement data 606 to acquirer system 162 in real-time and upon authorization of the SV purchase transaction and/or corresponding SV load transaction represented by the accessed portion of data 602.

Acquirer system 162 may receive settlement data 602 from POS terminal 122, and an acquirer settlement module 608 of acquirer system 162 may process settlement data 602 to obtain the SV load and/or purchase transaction blocks associated with corresponding ones of the authorized SV load and/or purchase transactions submitted for settlement by POS terminal 122. In one aspect, and based on data exchanged with a consensus module 610 of payment network system 182 across network 120B, acquirer settlement module 608 may establish that the received SV load and/or purchase transaction blocks are consistent with global SV block-chain ledger 187 maintained by payment-network system 182.

For example, and as described above, global SV block-chain ledger 187 maintains a complete SV-chain history for client device 102, payment-network system 182 may grant issuer system 142 and acquirer system 162 permission to access global SV block-chain ledger 187 across network 130B. In one aspect, acquirer settlement module 608 may access global SV block-chain ledger 187 (e.g., through consensus module 610 across network 130B), and may perform operations that establish a consistency between the global SV block-chain ledger 187 and received SV load and/or purchase transaction blocks. For example, acquirer settlement module 608 may deem the received SV load and/or purchase transaction blocks consistent with the existing ledger blocks of global SV block-chain ledger 187 when the transaction counters of these existing ledger blocks and the new SV load transaction block and/or the new SV purchase transaction block increase uniformly and without gaps.

In one instance, if acquirer settlement module 608 establishes an inconsistency between global SV block-chain ledger 187 and the SV load and/or purchase transaction blocks within settlement data 606, acquirer system 162 may decline to submit settlement data 606 to payment network system 182, and may return an error message to POS terminal 122. Alternatively, should acquirer settlement module 608 fail to establish any inconsistencies, acquirer settlement module 608 may forward settlement data 606 to a cryptographic module 614 of issuer system 162, which may apply a digital signature to settlement data 606 using a private cryptographic key 616 of acquirer system 162. Acquirer system 162 may transmit digitally signed settlement data 618 across network 130B to payment network system 182 using any of the communications protocols described above, and in some aspects, the transmission of digitally signed settlement data 618 to provider network system 182.

Consensus module 610 of payment network system 182 may receive and route digitally signed settlement data 618 across network 120B to issuer system 142. In some aspects, an issuer settlement module 620 may receive digitally signed settlement data 618 and perform any of the processes described above to determine whether the SV load and/or purchase transaction blocks included within digitally signed settlement data 618 are consistent with global SV block-chain ledger 187, such as accessing global SV block-chain ledger 187 through consensus module 610 to determine that the transaction counters of the existing ledger blocks of global SV block-chain ledger 187 and the received SV load and/or purchase transaction blocks increase uniformly and without gaps.

In one instance, if issuer settlement module 620 establishes an inconsistency between global block-chain ledger 612 and the SV load and/or purchase transaction blocks within digitally signed settlement data 618, issuer system 142 may decline to submit settlement data to payment network system 182, and may return an error message to POS terminal 122. Alternatively, should issuer settlement module 620 fail to establish any inconsistencies, a cryptographic module 622 of issuer system 142 may apply an additional digital signature to digitally signed settlement data 618 using a private cryptographic key 624 of issuer system 142 (e.g., to generate digitally countersigned settlement data 626), and issuer system 142 may transmit digitally countersigned signed settlement data 626 across network 1306 to payment network system 182 using any of the communications protocols described above.

Consensus module 610 may receive digitally countersigned signed settlement data 626, and may decode the digital signatures applied by issuer and acquirer systems 142 and 162 (e.g., as payment network system 182 acts as a certificate authority for both issuer and acquirer systems 142 and 162), and may obtain mutually agreeable authorized transaction data 628 (e.g., the SV load transaction and/or SV purchase transaction blocks included within digitally countersigned settlement data 626). A global block-chain generation module 630 of payment network system 182 may receive mutually agreeable authorized transaction data 628, and incorporate mutually agreeable authorized transaction data 628 into one or more new SV load transaction and/or SV purchase transaction blocks 632 within global block-chain ledger 612. Global block-chain generation module 630 may generate a confirmation 634 indicative of the inclusion of the one or more new ledger blocks within global block-chain ledger 612, which may be received by a settlement module 636 of payment network system 182.

Settlement module 636 may, in some aspects, access issuer settlement account data 185A and acquirer settlement account data 1856 maintained by payment network system 182 within SV settlement account data 184 and associated with, respectively, issuer system 142 and acquirer system 162. In response to received confirmation 636, settlement module 636 may settle funds from issuer settlement account data 185A to acquirer settlement account data 1856 in accordance with the authorized and now-settled SV purchase transaction. In certain instances, the settlement of the funds from issuer settlement account data 185A to acquirer settlement account data 1856 may occur in near-real time with respect to the authorization of the underlying SV purchase transaction, and without the significant delays associated with EMV-based clearance and settlement processes.

Figure 7:
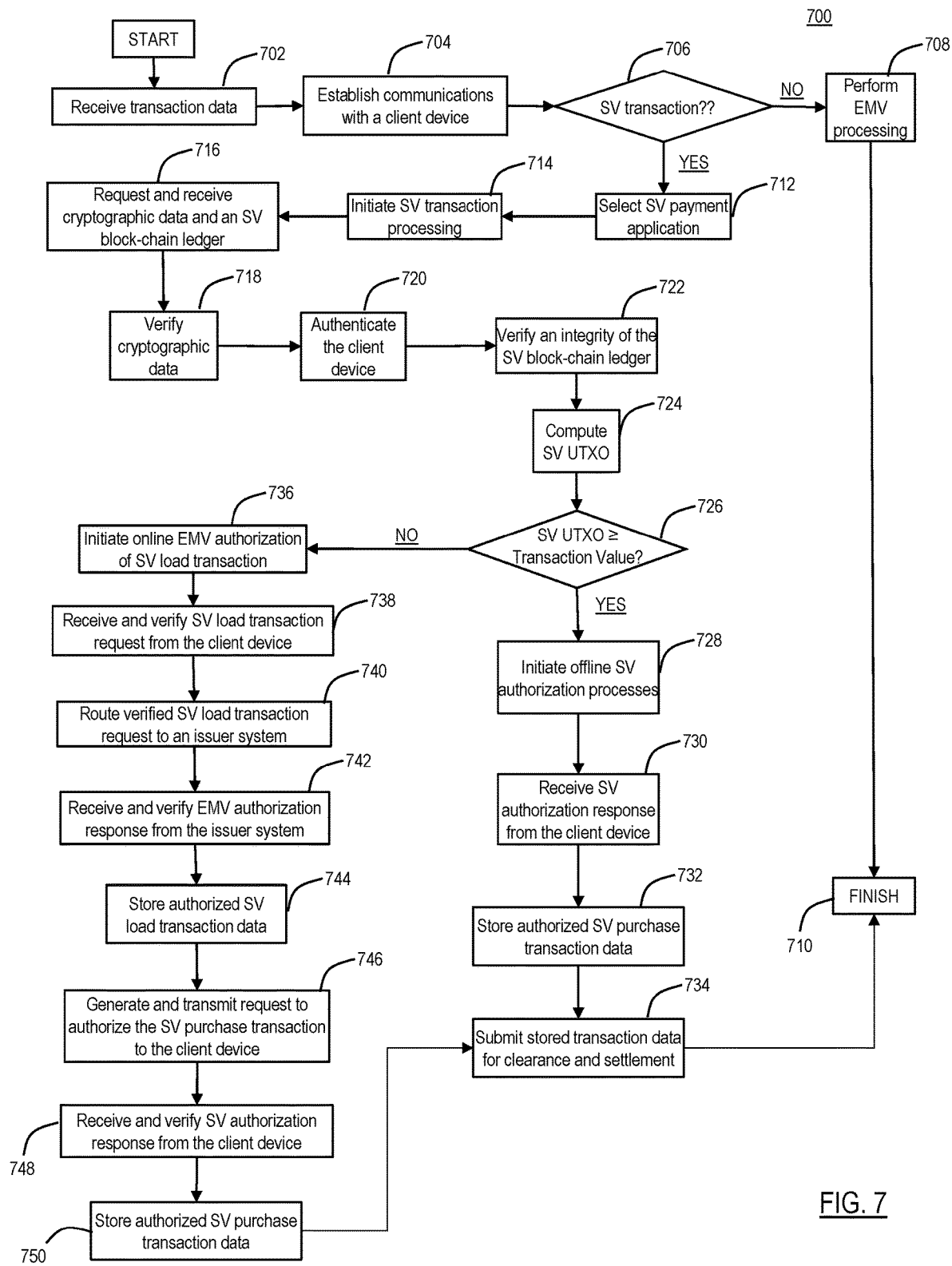

FIG. 7 is a flowchart of an example process 700 for authorizing and execution an initiated data exchange in real-time based on cryptographically secure distributed ledger data, in accordance with the disclosed embodiments. In some aspects, a point-of-sale (POS) terminal device, such as POS terminal 122 of FIG. 1, may perform the steps of example process 700. In some instances, POS terminal 122 may receive transaction data characterizing a initiated purchase transaction from a computing system maintained by a merchant that operates POS terminal 122. In certain instances, and as described above, the initiated purchase transaction may correspond to a stored-value (SV) purchase transaction having a transaction value that fails to exceed a configurable threshold transaction value. Further, a consumer payment device, e.g., client device 102 of FIG. 1, may establish communications with POS terminal 122 across a direct communications channel, e.g., direct communications channel 120A of FIG. 1, and client device 102 may provide data specifying a payment instrument available to fund the initiated SV purchase transaction to POS terminal 122 across direct communications channel 120A.

Further, and in additional aspects, client device 102 may locally store and execute a payment application linked to that payment instrument, e.g., an SV payment application, and a secure, immutable, and EMV-compatible distributed ledger data, e.g., SV block-chain ledger 113 of FIG. 1, that maintains a current balance of funds credited to client device 102 for use in SV purchase transactions by a computing system maintained by an issuer of the payment instrument, e.g., issuer system 142 of FIG. 1. By ensuring the immutability of the current balance of these loaded funds via the cryptographic security of the block-chain data structure, client device 102 may freely transmit the block-chain ledger to POS terminal 122 upon initiation of the SV purchase transaction, and POS terminal 122 may determine to authorize offline the initiated SV purchase transaction in real-time based the current balance of the loaded funds established by SV block-chain ledger 113, or alternatively, initiate an online transaction, e.g., an SV load transaction, through which issuer system 142 "loads" client device 102 with additional funds sufficient to authorize the initiated SV purchase transaction. As described above, certain of these exemplary processes provide a fast, reliable, and secure transaction capability between client device 102 and a POS terminal 122, and facilitate a near-real time clearing and settlement capability for individual SV purchase transactions authorized by the POS terminal 122 and client device 102.

Referring to FIG. 7, POS terminal 122 may receive transaction data characterizing an initiated purchase transaction from a computing system maintained and operated by a merchant (e.g., in step 702). For example, the computing system may correspond to a cash register operated by merchant 121 of FIG. 1, and the received transaction data may include, but is not limited to, a transaction value of the initiated purchase transaction, an identifier of a good or service involved in the initiated purchase transaction (e.g., a UPC, etc.), and a date and time of the initiated transaction. POS terminal 122 may, in certain instances, store the received transaction data within one or more tangible, non-transitory memories, e.g., within data repository 128 of FIG. 1.

Additionally, in some aspects, POS terminal 122 may detect and establish communications with a consumer payment device (e.g., client device 102 of FIG. 1) across a direct communications channel (e.g., in step 704). For example, and as described above, client device 102 may provide data specifying a payment instrument available to fund the initiated purchase transaction to POS terminal 122 across the direct communications channel. In some instances, client device 102 may include an integrated circuit that encodes one or more payment applications embedded into an EMV-compatible payment card, which may be disposed within a chip reader integrated into or in communication with POS terminal 122. As described above, client device 102 may include an interface unit having one or more electrical contacts that, when in engaged with corresponding terminal contacts of the chip reader, enable POS terminal 122 to detect client device 102 and establish the direct communications channel across the engaged electrical and terminal contacts.

In other instances, and consistent with the disclosed embodiments, client device 102 may also include a communications device, such as a smart phone, tablet computer, or wearable communications device, that when disposed proximate to POS terminal device 122, establishes direct communications channel 120A with POS terminal 122 using one or more wireless communications protocols, such as near-filed communications (NFC) protocols, Bluetooth™ communications protocols, and/or WiFi communications. The disclosed embodiments are, however, not limited to these exemplary client devices, and in other aspects, client device 102 may any additional or alternate device (e.g., a NFC sticker or dongle) capable of establishing direct communications channel 120A with POS terminal 122 and performing the exemplary processes described herein.

POS terminal 122 may, in certain aspects, determine whether the transaction value of the initiated purchase transaction (e.g., as specified within the received transaction data) exceeds a configurable SV purchase transaction threshold value (e.g., in step 706). As described herein, the configurable SV purchase transaction threshold value may establish an upper bound on transaction values that characterize SV purchase transactions, and POS terminal 122 may store the configurable SV purchase transaction threshold value locally within one or more tangible, non-transitory memories (e.g., within data repository 128 of FIG. 1).

If POS terminal 122 were to determine that the transaction value of the initiated purchase transaction exceeds the configurable SV threshold transaction value, POS terminal 122 may establish that the initiated purchase transaction is not an SV purchase transaction (e.g., step 706; NO). In conjunction with client device 102, POS terminal 122 may perform operations that authorize the initiated purchase transaction in accordance with one or more of the conventional EMV transaction authorization and communications protocols described above, and may perform operations that clear and settle the authorized purchase transaction using conventional EMV clearance and settlement processes involving the conventional payment rails (e.g., in step 708). Process 700 may then be complete in step 710.

Alternatively, if POS terminal 122 were to determine that the transaction value of the initiated purchase transaction fails to exceed the configurable SV threshold transaction value, POS terminal 122 may determine that the initiated purchase transaction represents an SV purchase transaction (e.g., step 706; YES). For example, and as described above, the initiated purchase transaction may correspond to a purchase of a cup of coffee for $2.50, and POS terminal 122 may determine that the purchase of the cup of coffee corresponds to an SV purchase transaction because the $2.50 transaction value of $2.50 does not exceed a $10.00 configurable SV threshold transaction value of $10.00. The disclosed embodiments are, however, not limited to these exemplary configurable SV purchase transaction threshold values, and in other instances, the configurable SV purchase transaction threshold value may correspond to any additional or alternate value appropriate to POS terminal 122, issuer system 142, or payment network system 182, as described above. Further, in some aspects, SV purchase transactions consistent with the disclosed embodiments may be characterized by values of any additional or alternate transaction parameter appropriate to merchant 121, issuer system 142, acquirer system 162, and/or payment network system 182.

In response to the determination that the initiated purchase transaction represents an SV purchase transaction, POS terminal 122 may perform operations that, in conjunction with client device 102, to identify and select an SV payment application that is stored locally by client device 102 and is capable of authorizing the initiated SV purchase transaction (e.g., in step 712). For example, and as described above, client device 102 may store one or more executable payment applications within a locally accessible data repository (e.g., within payment application data 110 of data repository 106). The executable payment applications may include an SV payment application that, when executed by client device 102, causes client device 102 to perform operations that authorize the initiated SV purchase transaction in accordance with one or more of the exemplary offline or online SV authentication processes described herein.

In some aspects, in step 712, POS terminal 122 may perform any of the exemplary processes described above to determine an application identifier (AID) liked to the SV payment application, and further, to select that SV payment application for processing by providing selection data that specifies the determined AID to client device 102. By way of example, POS terminal 122 may format the selection data (and other data exchanged with client device 102 in order to identify the AID of the SV payment application) in accordance with conventional EMV command protocols, e.g., as a standard SELECT EMV command. As described above, and in response the selection data, client device 102 may perform operations that process the received selection data, extract the application identifier assigned to the SV payment application, and access a stored SV payment application data file (e.g., an ADF) linked to the extracted application identifier and associated with the selected SV payment application. The SV payment application data file may identify terminal-specific data requested by client device 102 prior to initiating processing through the executed SV payment application, and client device 102 may package one or more portions of accessed SV payment application data file, such as the terminal-specific data, which client device 102 may transmit to POS terminal 122 across direct communications channel 120A.

POS terminal 122 may receive the packaged SV payment application data file from client device, and may perform operations that identify the terminal-specific input data requested by client device 102 prior to initiating processing through the executed SV payment application. In some aspects, POS terminal 122 may obtain terminal-specific parameter values (e.g., as stored within data repository 128) consistent with the requested input data, and may generate a request to initiate the SV purchase transaction authorization process and to execute the selected SV payment application, which includes the terminal-specific parameter values (e.g., in step 714). POS terminal 122 may format the request in accordance with conventional EMV command protocols, e.g., as a GET PROCESSING INFO command, and POS terminal 122 may transmit the request to client device 102 through terminal interface unit 120 using any of the communications described above.

As described above, client device 102 may receive the request and confirm that the received terminal-specific parameter values correspond to and satisfy the requested terminal-specific input data. In response to the confirmation, client device 102 may identify and obtain an application interchange protocol (AIP) and application file locator (AFL) linked to the application identifier of the SV payment application, and transmit data that includes the obtained AIP and AFL across direct communications channel 120A to POS terminal 122 using any of the communication protocols described above. As described above, the AIP of the SV payment application may specify certain authentication and verification processes implemented by the SV payment application, and the AFL of the SV payment application may identify elements of data that support the execution of the SV payment application and further, locations of these data elements within a data repository maintained by client device 102 (e.g., data repository 106 of FIG. 1). For example, the AFL for the SV payment application may identify an SV block-chain ledger, an issuer public key certificate, and a device public key certificate, which may be required by POS terminal 122 to authorize the initiated SV purchase transaction, and may include data identifying locations of these required data elements within data repository 106. The AFL for the SV payment application may also include identifiers and storage locations of elements of EMV-specific data, which may be required to authorize requested SV load transactions using the online EMV authentication processes described above.

POS terminal 122 may receive the data specifying the AIP and AFL of the selected SV payment application, and POS terminal 122 may parse the received data to obtain identifiers of the required data elements (e.g., the SV block-chain ledger, the issuer public key certificate, the device public key certificate, and the EMV-specific data) and the locations of these required data elements within data repository 106 of client device 102. In some aspects, and using any of the exemplary processes described above, POS terminal 122 may generate one or more requests to obtain the required data elements from the corresponding locations within data repository 106, and POS terminal 122 may sequentially transmit each of the generated data requests to client device 102 across direct communications channel 120A (e.g., in step 716). For example, each of the generated data requests may be formatted in accordance with conventional EMV command protocols, e.g., as READ RECORD commands, and POS terminal device 122 may transmit each of the data requests sequentially through terminal interface unit 126 using any of the communications protocols described above.

For example, the data requests generated and transmitted by POS terminal device 112 (e.g., in step 716) may, respectively, request the SV block-chain ledger, the issuer public key certificate, the device public key certificate, and the EMV-specific data associated with certain online EMV authentication processes. Client device 102 may receive each of the sequentially transmitted data requests (e.g., formatted as conventional READ RECORD commands), and may process each of the sequentially received data requests to identify a requested data element and location of that requested data element within data repository 106, to obtain the requested data element from its location within data repository 106, and package the obtained data element into a response for transmission to POS terminal 122 in a corresponding response. Client device 102 may transmit the generated responses to POS terminal 122 across direct communications channel 120A (e.g., through device interface unit 108 using any of the communication protocols described above). As described above, the generated responses may include, but are not limited to, the SV block-chain ledger, the issuer public key certificate, the device public key certificate, and the EMV-specific data associated with certain online EMV authentication processes, and in step 716, POS terminal 122 may receive the responses and store local copies of these data element within one or more tangible, non-transitory memories (e.g., data repository 128) for subsequent verification and processing.

In certain aspects, and upon receipt of the responses from client device 102, POS terminal 122 may perform any of the exemplary processes described above to verify the validity of the issuer and device public key certificates (e.g., in step 718). By way of example, POS terminal 122 may access a locally stored copy of a self-signed public cryptographic key of payment network system 182, and based on the public cryptographic key of payment network system 182, POS terminal 122 may perform operations that validate the issuer public key certificate and output a validated public cryptographic key of issuer system 142, as described above. Further, using the now-validated public cryptographic key of issuer system 142, POS terminal 122 may perform additional operations that validate of the device public key certificate based on the, and output a validated copy of the public cryptographic key associated with client device 102, as described above.

Upon successful validation of the issuer and device public key certificates, POS terminal 122 and client device 102 may perform operations that verify and confirm the received SV block-chain ledger is generated by client device 102, and not a counterfeit clone of client device 102 (e.g., in step 720). As described above, these verification processes may include, but are not limited to, secure, EMV-based dynamic data authentication (DDA) processes that specify, within a list of participating elements, contents of the received SV block-chain ledger along with a correspond challenge value (e.g., a random number generated by POS terminal 122). Based on the outcome of these EMV-based DDA processes, POS terminal 122 perform any of the exemplary processes described above to determine that the received SV block-chain ledger, as locally stored by data repository 128, is generated by client device 102, and not by a counterfeit clone of client device 102.

In response to the determination that received SV block-chain ledger was generated by client device 102, and not the counterfeit clone, POS terminal 122 may perform additional operations that verify an integrity of each transaction block included within the received SV block-chain ledger (e.g., in step 722). For example, and as described above, the received SV block-chain ledger includes an SV genesis block, an SV load transaction block, and one or more successive SV purchase transaction blocks that, in some aspects, may establish a current transaction cycle initiated by an authorized SV load transaction represented by the SV load transaction block. Further, and as described above, the SV load transaction block and each of the SV purchase transaction blocks include a prior block pointer, which references an immediate prior ledger block in the received block-chain ledger, and a hash pointer value generated by client device through an application of an appropriate hash algorithm to the concatenated contents of that immediately prior ledger block (e.g., as indicated by the prior block pointer).

POS terminal 122 may, in step 722, perform any of the exemplary processes described above to access the prior block pointer and the hash pointer value included within each SV load transaction block and SV purchase transaction block, identify the prior ledger block linked to each SV load transaction block and SV purchase transaction block, and compute a hash value of the concatenated contents of each of the identifier prior ledger blocks. Using any of the exemplary processes described above, POS terminal 122 may compare each of the computed hash values against a corresponding one of the access hash value points, and verify the integrity of the received SV block-chain ledger when each of the computed hash values match exactly the corresponding one of the access hash value points. If one or more of the computed hash values vary from the corresponding ones of the access hash value points, POS terminal 122 may decline to verify the integrity of the received SV block-chain ledger.

In response to the verified integrity of the received SV block-chain ledger, POS terminal 122 may perform any of the exemplary processes described above to compute a current balance of the funds loaded onto client device 102 during the current transaction cycle, e.g., an SV unspent transaction output (UTXO) available to fund the initiated SV purchase transaction (e.g., in step 724). POS terminal 122 may, in some aspects, perform any of the exemplary processes described above to compare the value of the SV UTXO for the current transaction cycle against the transaction value of the initiated purchase transaction and determine whether the SV UTXO value exceeds or is equivalent to the transaction amount (e.g., in step 726)

For example, POS terminal 122 may determine that the value of the SV UTXO for the current transaction cycle exceeds or is equivalent to the transaction value of the initiated SV purchase transaction (e.g., step 726; YES), and POS terminal 120 may elect to initiate an offline process to authorize the initiated SV purchase transaction without input from issuer 142 and transmit an authorization decision indicative of the offline authentication process to client device 102 (e.g., in step 728). As described above, the authorization decision may include transaction data characterizing the initiated transaction (e.g., the transaction value, the product identifier, etc.) and additionally or alternatively, data specifying the basis for the offline authorization of the initiated SV purchase transaction (e.g., data confirming that the current SV UTXO exceeds the transaction value of the initiated SV purchase transaction). As further described above, the authorization decision may be formatted in accordance with one or more conventional EMV command protocols, e.g., a standard GENERATE AC command that requests client device 102 generate an application cryptogram indicative of the offline authorization, and POS terminal 122 may transmit the authorization decision to client device 102 across the direct communications channel using any of the communications protocols described above.

In certain embodiments, and based on the determined validity and integrity of SV block-chain ledger 113, and the finality and liquidity characteristic of the funds loaded onto client device 102 by issuer system 142, POS terminal 122 perform any of the exemplary processes described above to authorize the initiated LPV transaction offline and without recourse to the computationally inefficient and uncertain risk assessment processes applied to transaction data during the performance of conventional offline EMV authorization processes. For example, client device 102 may execute the selected SV payment application, which may cause client device 102 to perform steps of an exemplary offline authentication process 800, illustrated in FIG. 8A, for authorizing an initiated SV purchase transaction offline and without input from a computing system maintained by an issuer of a payment instrument linked to the executed SV payment application, e.g., issuer system 142.

Referring to FIG. 8A, client device 102 may receive the authorization decision from POS terminal 122 across the direct communications channel (e.g. in step 802). In some instances, and as described above, the received authorization decision may include transaction data characterizing the initiated transaction (e.g., the transaction value, the product identifier, etc.) and additionally or alternatively, data specifying the basis for the offline authorization of the initiated SV purchase transaction, e.g., data confirming that the current SV UTXO exceeds the transaction value of the initiated SV purchase transaction. Based on portions of the received authentication decision, client device 102 may perform operations that confirm POS terminal 122's determination to authorize the initiated SV purchase transaction offline and without input from issuer system 142 (e.g., in step 804).

In certain aspects, and in response to the confirmation, client device 102 may perform any of the exemplary processes described above to generate and output an SV payment application cryptogram appropriate to the offline authorization of the initiated SV purchase transaction (e.g., in step 806). For instance, the generated SV payment application cryptogram may be structured in accordance with an EMV transaction certificate, which reflects a successful offline authorization of an initiated transaction within conventional EMV authorization processes. The disclosed embodiments are, however, not limited to these exemplary cryptogram structures, and in other aspects, the SV payment application cryptogram may incorporate any additional or alternate cryptogram appropriate to client device 102, associated with the offline authorization, and recognizable by POS terminal 122.

Client device 102 may also perform operations, such as those described above, to generate a new SV purchase transaction block that represents the now-authorized SV purchase transaction (e.g., in step 808). In certain aspects, the new SV purchase transaction block may be structured in accordance with any of the exemplary SV purchase transaction block structures described above (e.g., SV purchase transaction block 420 of FIG. 4B), and client device 102 may append the new SV purchase transaction block to a current version of the SV block-chain ledger to generate an updated SV block-chain ledger that reflects the newly authorized SV purchase transaction and its impact on a current balance of funds loaded onto client device 102 and available for use in additional SV purchase transaction (e.g., the current value of the SV UTXO).

In certain aspects, client device 102 may package the SV payment application cryptogram and additional data indicative of the offline authorization into an authorization response, which client device 102 may transmit to POS terminal 122 across the direct communications channel (e.g., in step 810). For example, and as described above, client device 102 may incorporate the new SV purchase transaction block, which includes the SV payment application cryptogram and the additional data, into the authorization response. Exemplary process 800 is then complete in step 812.

Referring back to FIG. 7, POS terminal 122 may receive the authorization response from client device 102 across the direct communications channel, and POS terminal 122 may perform any of the processes described above to verify an authenticity of the SV payment application cryptogram (e.g., as included within the authorization response) and its generation by client device 102, and based on the SV payment application cryptogram, determine that client device 102 confirmed the offline authorization of the initiated SV purchase transaction (e.g., in step 730). In some aspects, and as described above, POS terminal 122 may store the SV payment application cryptogram and data characterizing the now authorized SV purchase transaction (such as, but not limited to, a transaction counter of the authorized SV purchase transaction, the transaction value, the product identifier, and/or data identifying POS terminal 122 and/or client device 102) within transaction log 134 of data repository 128 (e.g., in step 732). Further, and in other aspects, the authorization response may include the new SV purchase transaction block generated by client device 102, and POS terminal 122 may associate the new SV purchase transaction block with the authorized SV purchase transaction, and store the new SV purchase transaction block within a corresponding portion of transaction log 134.

Further, POS terminal 122 may perform additional operations that submit portions of the stored data characterizing the authorized SV purchase transaction, including the new SV purchase transaction block, to acquirer system 162 for clearance and settlement in near-real time by payment network system 182 using any of the exemplary processes described above (e.g., in step 734). Exemplary process 700 may then be complete in step 712.

Referring back to step 726, if POS terminal 122 were to determine that the value of the SV UTXO for the current transaction cycle fails to exceed or be equivalent to the transaction value of the initiated SV purchase transaction (e.g., step 726; NO), POS terminal 120 may elect to initiate an online process that, based on input from issuer system 142, loads additional funds onto client device 102 for use in SV purchase transactions and authorizes the initiated SV purchase transaction in view of the loaded additional funds (e.g., in step 736). As described above, the authorization decision may include transaction data characterizing the initiated SV purchase transaction (e.g., the transaction value, the product identifier, etc.) and additionally or alternatively, data specifying the basis for the online authorization of the initiated SV purchase transaction, e.g., data confirming that the current SV UTXO fails to exceed or be equivalent to the transaction value of the initiated SV purchase transaction. Further, the authorization decision may be formatted in accordance with one or more conventional EMV command protocols, e.g., a standard GENERATE AC command that requests client device 102 generate an application cryptogram that requests an authorization of an SV load transaction by issuer system 142. In certain aspects, POS terminal 122 may transmit the authorization decision indicative of the online authentication process to client device 102 (e.g., in step 736), and client device 102 may execute the selected SV payment application and perform steps of an exemplary online authentication process 820, illustrated in FIG. 8B, for requesting authorization of an SV load transaction from issuer system 142.

Referring to FIG. 8B, client device 102 may receive the authorization decision from POS terminal 122 across the direct communications channel (e.g., In step 822). As described above, the received authorization decision may include transaction data characterizing the initiated SV purchase transaction (e.g., the transaction value, the product identifier, etc.) and additionally or alternatively, data specifying the basis for the online authorization of the initiated SV purchase transaction, e.g., data confirming that the current SV UTXO fails to exceed or be equivalent to the transaction value of the initiated SV purchase transaction. In some aspects, and based on portions of the received authentication decision, client device 102 may any of the exemplary processes described above to perform operations that confirm the determination of POS terminal 122 to initiate the online authentication of the initiated SV purchase transaction (e.g., in step 824).

In some aspects, and in response to the confirmation, POS terminal 122 may perform any of the exemplary processes described above to generate an application cryptogram consistent with and indicative of the initiated online authentication process, which requires an authorization of a requested SV purchase transaction by issuer system 142 (e.g., in step 826). For example, the generated application cryptogram may correspond to EMV application cryptogram indicative of the requested online SV load transaction, such as an authorization request cryptogram (ARQC) generated in accordance with one or more EMV authorization protocols. The disclosed embodiments are, however, not limited to these exemplary cryptogram structures, and in other aspects, the generated application cryptogram may incorporate any additional or alternate cryptogram appropriate to client device 102, associated with the offline authorization, and recognizable by POS terminal 122.

POS terminal 122 may perform operations to generate request data that includes the generated EMV application cryptogram (e.g., the ARQC) and additional data indicative of the requested authorization of the SV load transaction by issuer system 142 (e.g., in step 828). Client device 102 may transmit the generated request data to POS terminal 122 across direct communications channel 120A using any of the communications protocols described above (e.g., in step 830), and exemplary process 820 may be complete in step 832.

Referring back to FIG. 7, POS terminal 122 may receive the generated request data from client device 102, and may process the request data request and verify an authenticity of the EMV application cryptogram and its generation by client device 102 (e.g., in step 738). Based on the verification EMV application cryptogram 416, POS terminal 122 may route the received request data to issuer system 142 using any of the communications protocols described above (e.g., in step 740).

Issuer system 142 may receive the request data from POS terminal 122, process the received request data to extract and verify an authenticity of the EMV application cryptogram (e.g., the ARQC) and its generation by client device 102. Based on the verification of the EMV application cryptogram, issuer system 142 may perform any of the exemplary processes described above to transfer a predetermined or adaptively determined amount of funds (e.g., a transfer amount) from a payment instrument account linked to the executed SV payment application to an SV float account maintained by issuer system 142, authorize the requested SV load transaction in response to the successful transfer, and generate an application cryptogram indicative of the authorized SV load transaction. The application cryptogram may, in some instances, correspond to EMV application cryptogram indicative of the authorized SV load transaction (e.g., an authorization response cryptogram (ARC) generated in accordance with one or more EMV authorization protocols). The disclosed embodiments are, however, not limited to these exemplary cryptogram structures, and in other aspects, the application cryptogram generated by issuer system 142 may incorporate any additional or alternate cryptogram appropriate to issuer system 142, associated with the online authorization of the requested SV load transaction, and recognizable by client device 102 and POS terminal 122.

Issuer system 142 may also generate an authorization response that includes the application cryptogram (e.g., the ARC), which confirms the authorization of the requested SV load transaction, and additional data characterizing the confirmed and completed transfer, such as the transfer amount and other transaction details. Issuer system 140 may transmit the authorization response to POS terminal 122 using any of the exemplary communications protocols described above.

Referring back to FIG. 7, POS terminal 122 may receive the authorization response from issuer system 142 and may extract and verify an authenticity of the received application cryptogram (e.g., the ARC) and its generation by issuer system 142 (e.g., in step 742). Based on the EMV application cryptogram and portions of the authorization response, POS terminal 122 may determine that issuer system 142 authorized the requested SV load transaction and effected the transfer in accordance with the transfer amount (e.g., which loads client device 102 with funds consistent with the transfer amount for use in SV purchase transaction). In response to the determination, POS terminal 122 may store data characterizing the authorized SV load transaction, such as the transaction amount and certain transaction details within data repository 128, e.g., within a portion of transaction log 134 of data repository 128 (e.g., in step 744).

POS terminal 122 may also generate a request to authorize the initiated SV purchase transaction based on the authorized SV purchase transaction (e.g., in step 746). The generated request may include, but is not limited to, the EMV application cryptogram (e.g., the ARC) and certain transaction details (e.g., the transfer amount) and in some aspects, the generated request may be formatted in accordance with one or more conventional EMV command protocols, such as the standard GENERATE AC described above. As described above, by transmitting the second standard GENERATE AC to client device 102, POS terminal 122 may request that client device 102 perform operations that effect an offline authorization of the newly initiated SV purchase transaction in view of the authorized SV load transaction. In certain aspects, POS terminal 122 may transmit the generated request to client device 102 across the direct communications channel using any of the communications protocols described above (e.g., in step 746), and client device 102 may execute the selected SV payment application and perform steps of an exemplary authentication process 840, illustrated in FIG. 8C, for authorizing the initiated SV purchase transaction in view of the authorization of the corresponding SV load transaction by issuer system 142.

Referring to FIG. 8C, client device 102 may receive the request to authorize the initiated SV purchase transaction from POS terminal 122 across the direct communications channel in step 842, and in step 844, may perform any of the exemplary processes described herein to confirm the determination by POS terminal 122 to authorize the initiated SV purchase transaction in view of the authorized SV load transaction (e.g., the completed transfer from the payment instrument account of user 101 to the SV float account). As described above, the authorized SV load transaction, and the corresponding completed transfer, may load funds consistent with the transfer amount onto client device 102 for use in initiated SV purchase transactions, and in some aspects, client device 102 may authorize the initiated SV purchase transaction in response to a determination that the loaded funds increase the SV UTXO to a value that exceeds the transaction value of the initiated SV purchase transaction.

In response to the determination to authorize the initiated SV purchase transaction, client device 102 may perform operations that generate an SV payment application cryptogram reflecting the authorized SV purchase transaction (e.g., in step 846). For instance, the SV payment application cryptogram may be structured in accordance with an EMV transaction certificate, which reflects a successful offline authorization of an initiated transaction within conventional EMV authorization processes. The disclosed embodiments are, however, not limited to these exemplary cryptogram structures, and in other aspects, the SV payment application cryptogram may incorporate any additional or alternate cryptogram appropriate to client device 102, associated with the offline authorization, and recognizable by POS terminal 122.

In step 848, client device 102 may also perform operations, such as those described above, to initiate a new transaction cycle and a generate new SV block-chain ledger in response to the authorized SV load transaction (e.g., through which issuer system 142 transferred funds consistent with the transfer amount from the payment instrument account of user 101 to the SV float account). To initiate the new transaction cycle, client device 102 may also generate a new SV genesis block, which reflects the value of the SV UTXO prior to the authorized SV load transaction, a new SV load transaction block, which reflects the funds loaded onto client device 102 through the authorized SV load transaction, and a new SV purchase transaction block, which authorized SV purchase transaction that triggered the request for the SV load transaction. In certain aspects, the new SV genesis block, new SV load transaction block, and new SV purchase transaction block may be structured in accordance with any of the exemplary SV purchase transaction block structures described above (e.g., SV genesis block 552, SV load transaction block 554, and SV purchase transaction block 556), and client device 102 may incorporate these new ledger blocks into the SV block-chain ledger for the new transaction cycle.

In further aspects, client device 102 may generate an authorization response that includes the SV purchase transaction cryptogram (e.g., the transaction certificate), and additional data indicative of the authorized SV load transaction and the authorized SV purchase transaction, and client device may transmit the authorization response to POS terminal 122 across the direct communications channel 120A using any of the communications protocols described above (e.g., in step 850). In some aspects, the authorization response may also include the new SV load transaction block, which represents the authorized SV load transaction, and the new SV purchase transaction block, which represents the authorized SV purchase transaction. Exemplary process 840 may then be complete in step 852.

Referring back to FIG. 7, POS terminal 122 may receive the authorization response from client device 102 across the direct communications channel, and POS terminal 122 may perform any of the processes described above to verify an authenticity of the SV payment application cryptogram (e.g., as included within the authorization response) and its generation by client device 102, and based on the SV payment application cryptogram, determine that client device 102 confirmed the authorization of the initiated SV purchase transaction (e.g., in step 748). In some aspects, and as described above, POS terminal 122 may store the SV payment application cryptogram and data characterizing the now authorized SV purchase transaction (such as, but not limited to, a transaction counter of the authorized SV purchase transaction, the transaction value, the product identifier, and/or data identifying POS terminal 122 and/or client device 102) within transaction log 134 of data repository 128 (e.g., in step 750). Further, and in other aspects, the authorization response may include the both the new SV purchase transaction block and the new SV load transaction block generated by client device 102, and in step 750, POS terminal 122 may associate the new SV purchase transaction block with the authorized SV purchase transaction, and store the new SV purchase transaction block within a corresponding portion of transaction log 134. Additionally, and in step 750, POS terminal 122 may also store the new SV load transaction block within a portion of transaction log 134 that includes the previously stored data characterizing the authorized SV load transaction.

In some aspect, POS terminal 122 may perform additional operations that submit portions of the stored data characterizing the authorized SV purchase transaction, including the new SV purchase transaction block and the new SV load transaction block, to acquirer system 162 for clearance and settlement in near-real time by payment network system 182 using any of the exemplary processes described above (e.g., in step 734). Exemplary process 700 may then be complete in step 712.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including, but not limited to, transaction detection module 202, application selection module 206, selection module 209, application initiation module 214, initiation module 220, application data module 226, record request module 230, storage module 234, issue key validation module 302, device key validation module 306, authentication module 310, DDA module 314, block-chain verification module 320, SV processing module 324, determination module 402, offline SV transaction module 406, SV transaction module 410, cryptogram generation module 414, block-chain generation module 418, authorization response module 422, online SV transaction module 504, load transaction module 516, transfer module 520, confirmation module 528, cryptogram generation module 534, authorization response module 538, SV settlement module 604, acquirer settlement module 608, consensus module 610, cryptographic module 614, issuer settlement module 620, cryptographic module 622, global block-chain generation module 630, and settlement module 636, can be implemented as one or more computer programs, i.e., one or more modules of computer program instructions encoded on a tangible non-transitory program carrier for execution by, or to control the operation of, a data processing apparatus (or a computer system). Additionally or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and/or "system" refer to data processing hardware and encompasses all kinds of apparatus, devices, and machines for processing data, including by way of example a programmable processor, a computer, or multiple processors or computers. The apparatus, device, and/or system can also be or further include special purpose logic circuitry, such as an FPGA (field programmable gate array) or an ASIC (application-specific integrated circuit). The apparatus, device, and/or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A terminal device, comprising:
a memory storing instructions;
a communications unit;
an interface unit; and
at least one processor coupled to the communications unit, the interface unit, and the memory, the at least one processor being configured to execute the instructions to:
receive, through the communications unit, transaction data that characterizes a transaction initiated at the terminal device, the transaction data comprising a first transaction value of the initiated transaction;
transmit a request to, and receive a response from, a client device through the interface unit, the response including first data elements of a distributed ledger and first cryptographic data, the first data elements comprising second transaction values of prior transactions involving the client device, and the first cryptographic data comprising a first public key certificate of the client device;
authenticate the client device based on a validation of the first public key certificate, and determine a balance of funds available to the client device based on the second transaction values;
authorize the initiated transaction when the balance of available funds exceeds or is equivalent to the first transaction value; and
transmit, through the interface unit, first confirmation data indicative of the authorized transaction to the client device, the first confirmation data comprising the first transaction value;
receive, through the interface unit, and from the client device, a second data element of the distributed ledger that tracks an impact of the initiated transaction on the balance of funds available at the client device, the second data element comprising a first application cryptogram associated with an application program executed at the client device;
based on a verification of the first application cryptogram, store the second data element within a portion of the memory and perform operations that execute the initiated transaction in accordance with the received transaction data.

2. The terminal device of claim 1, wherein:
the first cryptographic data further comprises a second public key certificate of a computing system associated with the client device; and
the at least one processor is further configured to load second cryptographic data from the memory, the second cryptographic data comprising the public cryptographic key of the certificate authority.

3. The terminal device of claim 2, wherein the at least one processor is further configured to execute the instructions to:
validate the second public key certificate based on the public cryptographic key of the certificate authority;
obtain a public cryptographic key of the associated computing system from the validated second public key certificate;
validate the first public key certificate based on the public cryptographic key of the associated computing system;
obtain a public cryptographic key of the client device from the validated first public key certificate;
in response to the validation of the first and second public key certificates, transmit authentication challenge data to the client device through the interface unit, the authentication challenge data identifying an element of device data and comprising a challenge value;
receive a response to the authentication challenge data from the client device through the interface unit, the response comprising the challenge value, the device data element, and a digital signature applied to the challenge value and the device data element, the device data element comprises a subset of the first elements of the distributed ledger data;
validate the digital signature based the public cryptographic key of the client device;
in response to the validation of the digital signature, determine that the device data element matches corresponding data stored by the terminal device; and
establish the authenticity of the client device based on the determination that the device data element matches the corresponding data element stored by the terminal device.

4. The terminal device of claim 1, wherein the at least one processor is further configured to execute the instructions to verify an integrity of the first data elements of the distributed ledger in response to the established authenticity of the client device.

5. The terminal device of claim 1, wherein
the second data element comprises a block pointer value and a hash pointer value, the block pointer value identifying a corresponding one of the first data elements, and the hash pointer value comprising a hash value of the corresponding one of the first data elements.

6. The terminal device of claim 5, wherein the at least one processor is further configured to execute the instructions to:
access the block pointer value and the hash pointer value included within the second data element;
identify the corresponding one of the first data elements based on the accessed block pointer value;
compute an additional hash value based on the data included within the corresponding one of the first data elements;
determine that the additional hash value corresponds to the hash value of the accessed hash pointer value;
verify the integrity of the second data element in response to the determination that the additional hash value corresponds to the hash value of the accessed hash pointer value.

7. The terminal device of claim 1, wherein:
the application program executed at the client device comprises a payment application associated with a payment instrument, the payment instrument being issued by an issuer computing system;
the initiated transaction comprises a purchase transaction;

the prior transactions comprise a prior load transaction and a prior purchase transaction involving the client device, the prior load transaction initiating a current transaction cycle and being authorized by the issuer computing system, the prior load transaction allocating funds to the client device, and the prior purchase transaction consuming a portion of the allocated funds;

the first data elements comprise first ledger blocks, the first ledger blocks comprising (i) a genesis block that identifies a prior balance of funds allocated to the client device during a prior transaction cycle; (ii) a load transaction block identifying a value of the funds allocated to the client device by the prior load transaction; and (iii) a first purchase transaction block identifying a transaction value of the prior purchase transaction;

the second transaction values comprise the the prior balance of funds allocated to the client device during the prior transaction cycle, the value of the funds allocated to the client device by the prior load transaction, and the transaction value of the prior purchase transaction;

the balance of available funds comprises a remaining balance of the funds allocated to the client device during the current transaction cycle;

the second data element comprises a second purchase transaction block, the second purchase transaction block comprising a block pointer value, a hash pointer value, the first application cryptogram, and the transaction value of the initiated purchase transaction, the block pointer value identifying the first purchase transaction block, the hash pointer value comprising a hash value of data included within the first purchase transaction block and a transaction counter; and the at least one processor is further configured to execute the instructions to transmit, upon authorization of the initiated purchase transaction, the second purchase transaction block to a computing system associated with a payment network for clearance and settlement.

8. The terminal device of claim 1, wherein the at least one processor is further configured to execute the instructions to:

determine that the first transaction value of the initiated data exchange exceeds the balance of available funds;

transmit second confirmation data to the client device through the interface unit, the second confirmation data being indicative of the determination that the first transaction value exceeds the balance of available funds;

receive, through the interface unit, and from the client device, a request to authorize an intervening load transaction that facilitates the initiated transaction, the request comprising a second application cryptogram of the application program executed at the client device;

verify the second application cryptogram and transmit the request to a computer system associated with the client device;

receive data confirming an authorization of the intervening load transaction from the associated computing system through the communications unit, the received data comprising a third transaction value that characterizes the intervening load transaction and a third application cryptogram indicative of the authorization of the intervening load transaction;

verify the received data, and authorize the initiated transaction in response to the authorization of the intervening load transaction by the associated computing system; and transmit third confirmation data indicative of the authorization of the initiated transaction and the intervening load transaction to the client device through the interface module, the third confirmation data comprising the third transaction value and the third application cryptogram.

9. The terminal device of claim 8, wherein:

the data received from the associated computing system includes the third application cryptogram; and the at least one processor is further configured to execute the instructions to validate the third application cryptogram and store the third transaction value that characterizes the intervening load transaction in the memory;

receive, from the client device through the interface unit, a fourth application cryptogram and one or more additional data elements of the distributed ledger; and validate the fourth application cryptogram and store the one or more additional data elements of the distributed ledger in the memory.

10. The terminal device of claim 9, wherein:

the associated computing system comprises the issuer computing system;

the intervening load transaction is authorized by the issuer computing system, the authorized load transaction initiating an additional transaction cycle;

the third transaction value comprises a value of funds allocated to the client device by the authorized intervening load transaction; and the at least one processor is further configured to execute the instructions to transmit, upon authorization of the initiated purchase transaction, the one or more additional data elements of the distributed ledger to computing system associated with a payment network.

11. The apparatus of claim 1, wherein:

the first application cryptogram is indicative of an offline authorization of the initiated transaction by the application executed at the client device; and the at least one processor is further configured to execute the instructions to validate a structure of the first application cryptogram, and to verify the first application cryptogram based on the validated structure.

12. The apparatus of claim 1, wherein the at least one processor is further configured to execute the instructions to:

verify the first application cryptogram, and verify an integrity of the second data element; and based on the verified first application cryptogram and on the verified integrity of the second data element, store the second data element within the portion of the memory and perform the operations that execute the initiated transaction in accordance with the transaction data.

13. The apparatus of claim 12, wherein:

the transaction data comprises account data associated with a payment instrument, the payment instrument being associated with the application program executed at the client device; and the operations that execute the initiated transaction comprises transmitting, via the communications unit, at least a portion of the second data element to a computing system associated with the payment instrument.

14. A computer-implemented method, comprising:

receiving, by one or more processors, transaction data that characterizes a transaction initiated at a terminal device, the transaction data comprising a first transaction value of the initiated transaction;

obtaining, by one or more processors, and from a client device, first data elements of a distributed ledger and first cryptographic data, the first data elements comprising second transaction values of prior transactions involving the client device, and the first cryptographic data comprising a first public key certificate of the client device;

by one or more processors, authenticating the client device based on a validation of the first public key certificate, and determining a balance of funds available to the client device based on the second transaction values;

authorizing, by one or more processors, the initiated purchase transaction when the balance of available funds exceeds or is equivalent to the first transaction value;

transmitting, by one or more processors, first confirmation data indicative of the authorized transaction to the client device, the first confirmation data comprising the first transaction value;

receiving, by one or more processors, and from the client device, a second data element of the distributed ledger that tracks an impact of the initiated transaction on the balance of funds available at the client device, the second data element comprising a first application cryptogram associated with an application program executed at the client device;

by one or more processors, and based on a verification of the first application cryptogram, storing the second data element within a data repository and performing operations that execute the initiated transaction in accordance with the received transaction data.

15. The computer-implemented method of claim 14, wherein:
the first cryptographic data further comprises a second public key certificate of a computing system associated with the client device; and
the computer-implemented method further comprises loading, by one or more processors, second cryptographic data from the data repository, the second cryptographic data comprising the public cryptographic key of the certificate authority.

16. The computer-implemented method of claim 15, wherein:
the computer-implemented method further comprises, by one or more processors:
validating the second public key certificate based on the public cryptographic key of the certificate authority;
obtaining a public cryptographic key of the associated computing system from the validated second public key certificate;
validating the first public key certificate based on the public cryptographic key of the associated computing system;
obtaining a public cryptographic key of the client device from the validated first public key certificate;
in response to the validation of the first and second public key certificates, transmitting authentication challenge data to the client device, the authentication challenge data identifying an element of device data and comprising a challenge value;
receiving a response to the authentication challenge data from the client device, the response comprising the challenge value, the device data element, and a digital signature applied to the challenge value and the device data element, the device data element comprises a subset of the first elements of the distributed ledger data;
validating the digital signature based the public cryptographic key of the client device; and
in response to the validation of the digital signature, determining that the device data element matches corresponding data stored by the terminal device; and
the authenticating comprises authenticating the client device based on the determination that the device data element matches the corresponding data element stored by the terminal device.

17. The computer-implemented method of claim 14, further comprising, by the one or more processors, verifying an integrity of the first data elements of the distributed ledger in response to the authentication of the client device.

18. The computer-implemented method of 14, wherein the second data element comprises a block pointer value and a hash pointer value, the block pointer value identifying a corresponding one of the first data elements, and the hash pointer value comprising a hash value of the corresponding one of the first data elements.

19. The computer-implemented method of claim 18, further comprising, by one or more processors:
accessing the block pointer value and the hash pointer value included within the second data element;
identifying the corresponding one of the first data elements based on the accessed block pointer value;
computing an additional hash value based on the data included within the corresponding one of the first data elements;
determining that the additional hash value corresponds to the hash value of the accessed hash pointer value; and
verifying the integrity of the second data element in response to the determination that the additional hash value corresponds to the hash value of the accessed hash pointer value.

20. A tangible, non-transitory computer-readable medium storing instructions that, when executed by at least one processor, cause the at least one processor to perform a method, comprising:
receiving transaction data that characterizes a transaction initiated at a terminal device, the transaction data comprising a first transaction value of the initiated transaction;
obtaining and from a client device, first data elements of a distributed ledger and first cryptographic data, the first data elements comprising second transaction values of prior transactions involving the client device, and the first cryptographic data comprising a first public key certificate of the client device;
authenticating the client device based on a validation of the first public key certificate, and determining a balance of funds available to the client device based on the second transaction values;
authorizing, by one or more processors, the initiated purchase transaction when the balance of available funds exceeds or is equivalent to the first transaction value; and
transmitting first confirmation data indicative of the authorized transaction to the client device, the first confirmation data comprising the first transaction value;
receiving, from the client device, a second data element of the distributed ledger that tracks an impact of the initiated transaction on the balance of funds available at the client device, the second data element comprising an application cryptogram associated with an application program executed at the client device;

based on a verification of the first application cryptogram, storing the second data element within a data repository and performing operations that execute the initiated transaction in accordance with the received transaction data.

\* \* \* \* \*